US008006626B2

(12) United States Patent
Kumar et al.

(10) Patent No.: US 8,006,626 B2
(45) Date of Patent: Aug. 30, 2011

(54) SYSTEM AND METHOD FOR COOLING A BATTERY

(75) Inventors: Ajith Kuttannair Kumar, Erie, PA (US); John D. Butine, Erie, PA (US)

(73) Assignee: General Electric Company, Schenectady, NY (US)

( * ) Notice: Subject to any disclaimer, the term of this patent is extended or adjusted under 35 U.S.C. 154(b) by 1078 days.

(21) Appl. No.: 11/745,137

(22) Filed: May 7, 2007

(65) Prior Publication Data

US 2008/0277101 A1 Nov. 13, 2008

(51) Int. Cl.
*B61C 5/02* (2006.01)
(52) U.S. Cl. .......................... 105/49; 180/68.1
(58) Field of Classification Search .............. 180/68.1, 180/68.2, 65.1, 65.245, 65.31, 68.5, 65.27; 105/48.3, 49, 50, 27, 26.05, 59; 454/69, 454/159, 2, 57, 58, 244, 251, 258, 272; 165/104.28
See application file for complete search history.

(56) References Cited

U.S. PATENT DOCUMENTS

| | | | | |
|---|---|---|---|---|
| 2,204,926 A | * | 6/1940 | Clingerman | 180/68.1 |
| 2,709,967 A | * | 6/1955 | Dilworth | 105/35 |
| 3,513,326 A | * | 5/1970 | Potts | 290/55 |
| 3,771,293 A | * | 11/1973 | Vest | 55/319 |
| 3,821,997 A | | 7/1974 | Sieren | |
| 3,834,479 A | | 9/1974 | Bowers et al. | |
| 3,838,745 A | | 10/1974 | Kappei | |
| 3,866,704 A | | 2/1975 | Bowers et al. | |
| 3,903,981 A | | 9/1975 | Peterson | |
| 4,013,136 A | | 3/1977 | Fear | |
| 4,077,485 A | | 3/1978 | Bonora et al. | |
| 4,100,333 A | | 7/1978 | Haas et al. | |
| 4,107,402 A | | 8/1978 | Dougherty et al. | |
| 4,168,759 A | * | 9/1979 | Hull et al. | 180/2.2 |
| 4,252,206 A | | 2/1981 | Burkholder et al. | |
| 4,407,911 A | | 10/1983 | Hooke | |
| 4,423,368 A | * | 12/1983 | Bussiere | 322/35 |

(Continued)

FOREIGN PATENT DOCUMENTS

WO 2007027020 A1 3/2007

OTHER PUBLICATIONS

International Search Report issued in connection with corresponding PCT Application No. PCT/US2008/057192 on Oct. 20, 2009.

(Continued)

*Primary Examiner* — J. Allen Shriver, II
*Assistant Examiner* — Brodie Follman
(74) *Attorney, Agent, or Firm* — Robert Wawrzyn, Esq.; Cian G. O'Brien, Esq.; Beusse Wolter Sanks Mora & Maire, P.A.

(57) ABSTRACT

A system is provided for cooling an energy storage system of a hybrid electric vehicle. The energy storage system includes at least one energy storage device. The system includes an inlet positioned on the outer surface of the vehicle above the platform. More particularly, the system includes a cooling fluid duct in flow communication with the inlet and the at least one energy storage device. Additionally, the system includes a blower powered by a respective motor and positioned within the to draw cooling fluid into the inlet and through the cooling fluid duct to pass the cooling fluid over or through the at least one energy storage device and into a common vented area of the vehicle.

7 Claims, 12 Drawing Sheets

U.S. PATENT DOCUMENTS

| | | | |
|---|---|---|---|
| 4,435,486 A | 3/1984 | Pomaro et al. | |
| 4,443,523 A | 4/1984 | Hasenauer | |
| 4,443,524 A | 4/1984 | Meinhold et al. | |
| 4,515,233 A | 5/1985 | Silverstein | |
| 4,520,887 A | 6/1985 | DiFazio | |
| 4,565,256 A | 1/1986 | Valdez | |
| 4,606,422 A * | 8/1986 | Jewett | 180/68.1 |
| 4,632,205 A * | 12/1986 | Lewis | 180/165 |
| 4,723,618 A | 2/1988 | Coonradt | |
| 4,754,827 A | 7/1988 | Hirabayashi | |
| 4,756,978 A | 7/1988 | Nitcher et al. | |
| 4,840,221 A * | 6/1989 | Dumas et al. | 165/41 |
| 4,854,540 A | 8/1989 | Balek | |
| 4,865,929 A | 9/1989 | Eck | |
| 4,907,645 A * | 3/1990 | Dumas et al. | 165/41 |
| 4,966,346 A | 10/1990 | Karna et al. | |
| 5,140,744 A | 8/1992 | Miller | |
| 5,280,827 A * | 1/1994 | Taylor et al. | 180/165 |
| 5,287,004 A * | 2/1994 | Finley | 290/55 |
| 5,341,652 A * | 8/1994 | Tajiri et al. | 62/244 |
| 5,377,947 A | 1/1995 | Johnson | |
| 5,432,026 A | 7/1995 | Sahm et al. | |
| 5,490,572 A * | 2/1996 | Tajiri et al. | 180/65.1 |
| 5,547,160 A | 8/1996 | Johnson | |
| 5,555,950 A | 9/1996 | Harada et al. | |
| 5,585,204 A | 12/1996 | Oshida et al. | |
| 5,633,095 A | 5/1997 | Ishikawa et al. | |
| 5,680,032 A * | 10/1997 | Pena | 290/52 |
| 5,736,272 A | 4/1998 | Veenstra et al. | |
| 5,824,432 A | 10/1998 | Currie | |
| 5,937,664 A * | 8/1999 | Matsuno et al. | 62/259.2 |
| 6,004,689 A | 12/1999 | Walker et al. | |
| 6,007,937 A | 12/1999 | Rodriguez et al. | |
| 6,010,543 A | 1/2000 | Berkey et al. | |
| 6,051,336 A | 4/2000 | Dougherty et al. | |
| 6,085,854 A | 7/2000 | Nishikawa | |
| 6,138,781 A * | 10/2000 | Hakala | 180/2.2 |
| 6,153,331 A | 11/2000 | Brantley et al. | |
| 6,161,810 A | 12/2000 | Crow et al. | |
| 6,190,795 B1 | 2/2001 | Daley | |
| 6,220,383 B1 * | 4/2001 | Muraki et al. | 180/68.5 |
| 6,230,834 B1 | 5/2001 | Van Hout et al. | |
| 6,236,185 B1 | 5/2001 | Hines et al. | |
| 6,237,357 B1 * | 5/2001 | Hirao et al. | 62/325 |
| 6,255,015 B1 | 7/2001 | Corrigan et al. | |
| 6,291,095 B1 | 9/2001 | Griffey et al. | |
| 6,302,228 B1 * | 10/2001 | Cottereau et al. | 180/68.1 |
| 6,308,639 B1 | 10/2001 | Donnelly et al. | |
| 6,327,980 B1 * | 12/2001 | Chen et al. | 105/26.05 |
| 6,333,091 B1 | 12/2001 | Kasugai et al. | |
| 6,408,766 B1 * | 6/2002 | McLaughlin et al. | 105/231 |
| 6,435,264 B1 * | 8/2002 | Konno et al. | 165/41 |
| 6,443,253 B1 * | 9/2002 | Whitehead et al. | 180/68.1 |
| 6,481,230 B2 * | 11/2002 | Kimishima et al. | 62/239 |
| 6,512,347 B1 | 1/2003 | Hellmann et al. | |
| 6,564,893 B2 | 5/2003 | Lipman | |
| 6,565,620 B1 * | 5/2003 | Greeson | 55/385.3 |
| 6,572,999 B1 | 6/2003 | Stocchiero | |
| 6,591,758 B2 | 7/2003 | Kumar | |
| 6,612,246 B2 | 9/2003 | Kumar | |
| 6,615,118 B2 | 9/2003 | Kumar | |
| 6,632,560 B1 | 10/2003 | Zhou et al. | |
| 6,645,664 B2 | 11/2003 | Nakanishi et al. | |
| 6,662,892 B2 * | 12/2003 | Falk et al. | 180/68.1 |
| 6,668,957 B2 | 12/2003 | King | |
| 6,750,630 B2 * | 6/2004 | Inoue et al. | 320/104 |
| 6,871,829 B2 | 3/2005 | Shannon, Jr. | |
| 6,910,529 B2 * | 6/2005 | Stone et al. | 165/299 |
| 6,931,878 B2 * | 8/2005 | Kubota et al. | 62/259.2 |
| 7,004,274 B2 * | 2/2006 | Shibasawa et al. | 180/68.5 |
| 7,014,002 B2 | 3/2006 | Mizuta | |
| 7,021,412 B2 * | 4/2006 | Koike et al. | 180/68.5 |
| 7,451,843 B2 * | 11/2008 | Nakashima et al. | 180/68.1 |
| 7,559,295 B2 * | 7/2009 | Yamada et al. | 123/41.31 |
| 7,571,785 B2 * | 8/2009 | Ferdows | 180/68.1 |
| 7,635,040 B2 * | 12/2009 | Seo et al. | 180/68.1 |
| 7,642,002 B2 * | 1/2010 | Hamery et al. | 429/120 |
| 7,647,788 B2 * | 1/2010 | Okuda et al. | 62/259.2 |
| 7,661,370 B2 * | 2/2010 | Pike et al. | 105/50 |
| 7,735,331 B2 * | 6/2010 | Zhu et al. | 62/259.2 |
| 2001/0005991 A1 * | 7/2001 | Niimi et al. | 62/133 |
| 2003/0089540 A1 * | 5/2003 | Koike et al. | 180/68.5 |
| 2003/0098191 A1 * | 5/2003 | Takedomi et al. | 180/68.5 |
| 2003/0186115 A1 * | 10/2003 | Shibasawa et al. | 429/100 |
| 2004/0004461 A1 * | 1/2004 | Hamada et al. | 320/112 |
| 2004/0094115 A1 * | 5/2004 | Jatzke et al. | 123/198 E |
| 2004/0098983 A1 * | 5/2004 | Naruse et al. | 60/428 |
| 2005/0133206 A1 * | 6/2005 | Scott | 165/122 |
| 2005/0279242 A1 | 12/2005 | Maier et al. | |
| 2006/0001399 A1 * | 1/2006 | Salasoo et al. | 320/104 |
| 2006/0080986 A1 * | 4/2006 | Inoue | 62/259.2 |
| 2006/0116061 A1 * | 6/2006 | Alberternst et al. | 454/2 |
| 2006/0144350 A1 * | 7/2006 | Nakashima et al. | 123/41.01 |
| 2006/0214626 A1 | 9/2006 | Nilson et al. | |
| 2006/0283350 A1 | 12/2006 | Kumar et al. | |
| 2006/0284601 A1 * | 12/2006 | Salasoo et al. | 320/150 |
| 2007/0102213 A1 * | 5/2007 | Seo et al. | 180/68.1 |
| 2008/0113600 A1 * | 5/2008 | Kim | 454/105 |
| 2008/0115989 A1 * | 5/2008 | Matte et al. | 180/68.1 |
| 2008/0202137 A1 * | 8/2008 | Inoue | 62/186 |
| 2008/0264291 A1 * | 10/2008 | Pike et al. | 105/50 |
| 2008/0276631 A1 * | 11/2008 | Kumar et al. | 62/118 |
| 2008/0276632 A1 * | 11/2008 | Kumar | 62/118 |
| 2008/0277101 A1 * | 11/2008 | Kumar et al. | 165/104.28 |
| 2009/0088062 A1 * | 4/2009 | Major et al. | 454/70 |
| 2009/0173471 A1 * | 7/2009 | Sakamoto | 165/41 |
| 2009/0176150 A1 * | 7/2009 | Yanaka | 429/120 |
| 2009/0249803 A1 * | 10/2009 | Suzuki et al. | 62/56 |
| 2009/0260905 A1 * | 10/2009 | Shinmura | 180/68.1 |
| 2009/0293760 A1 * | 12/2009 | Kumar et al. | 105/59 |
| 2010/0043470 A1 * | 2/2010 | Kang et al. | 62/239 |
| 2010/0175940 A1 * | 7/2010 | Taneda et al. | 180/68.5 |

OTHER PUBLICATIONS

International Written Opinion issued in connection with corresponding PCT Application No. PCT/US2008/057192 on Oct. 20, 2009.

* cited by examiner

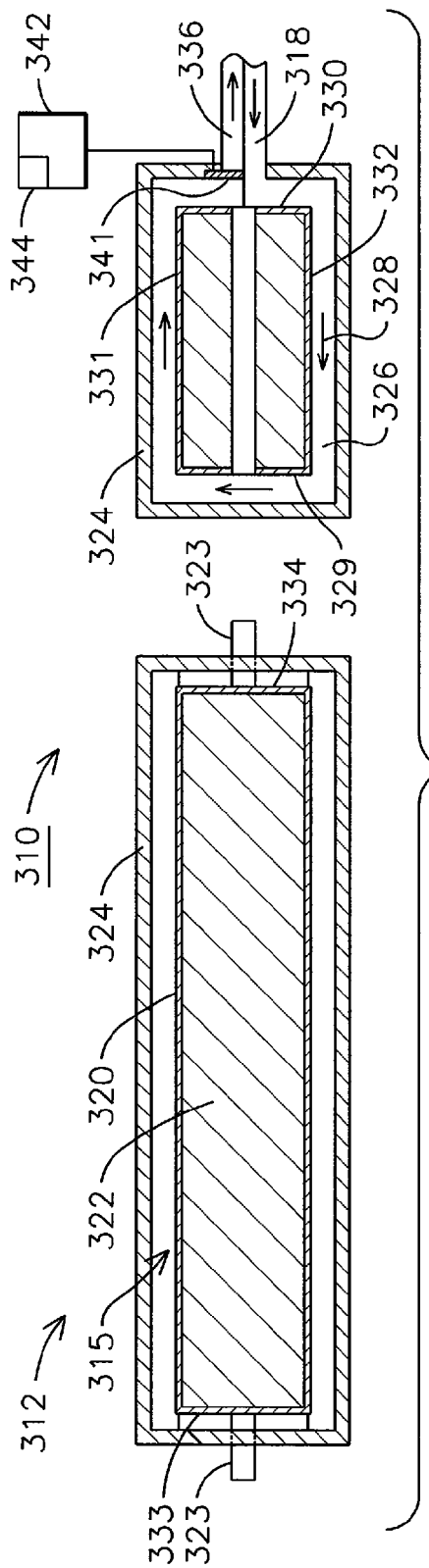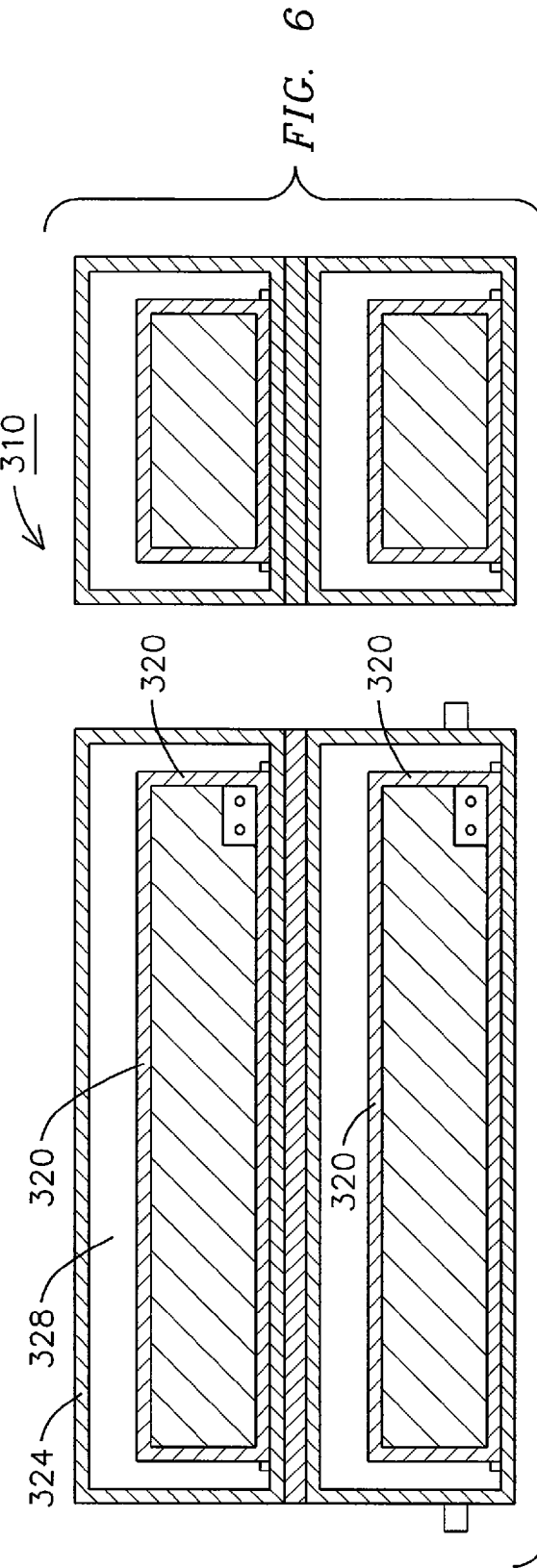
FIG. 5
FIG. 6

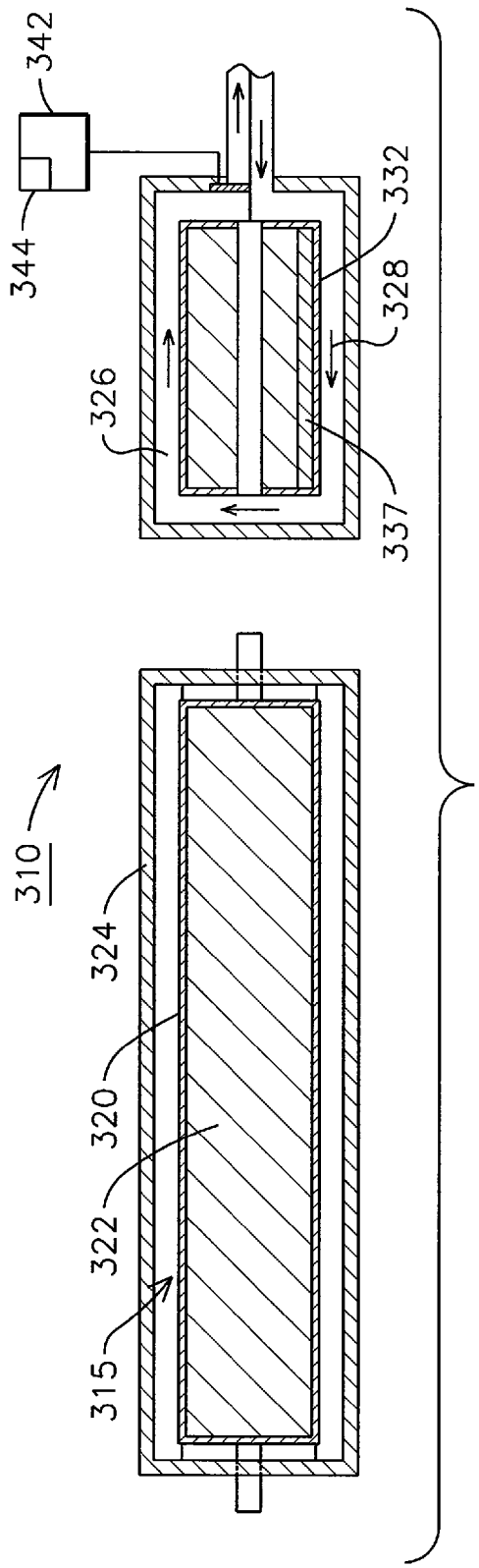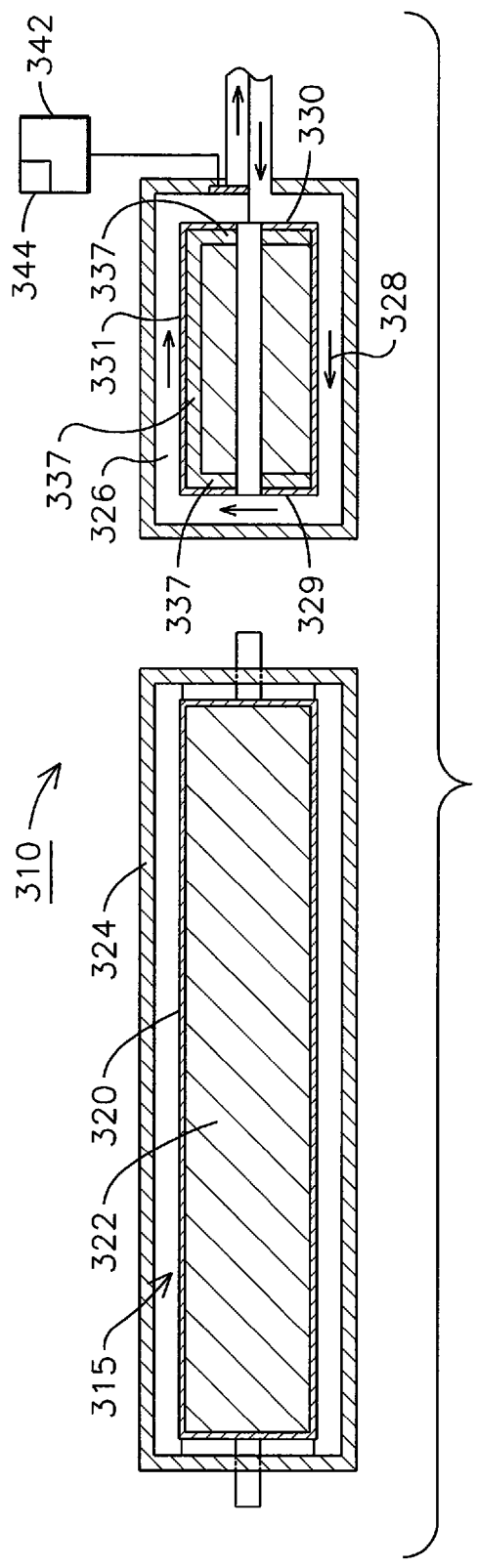

SYSTEM AND METHOD FOR COOLING A BATTERY

FIELD OF THE INVENTION

The present invention relates to large battery applications, and more particularly, to a system and method for cooling a large battery system, such as an energy storage system of a hybrid electric vehicle, for example.

BACKGROUND OF THE INVENTION

Hybrid energy diesel electric vehicles, such as hybrid energy diesel electric locomotives, for example, include an energy storage system with several energy storage devices (i.e. batteries). These energy storage devices are typically utilized to store secondary electric energy during a dynamic braking mode, when the traction motors generate excess electrical energy which may be stored, or during a motoring mode, when the locomotive engine produces excess electrical energy which may be stored. Each locomotive typically includes many energy storage devices, such as between ten and fifty, for example, where each energy storage device is a large massive body including several hundred individual cells combined together, and each energy storage device amounts to several hundred pounds in weight.

A conventional cooling system 200 for a plurality of energy storage devices 202 of a current locomotive is illustrated in FIG. 1. Each energy storage device 202 is positioned beneath a locomotive platform, and a respective motor-driven blower 204 and accompanying wire mesh 206 (or screen) which are individually coupled to each energy storage device 202 beneath the locomotive platform. During operation of the cooling system 200, each blower/motor 204 draws outside air from beneath the locomotive platform through the respective wire mesh 206 and over a respective energy storage device 202, before expelling the outside air through a respective exhaust vent 208. Accordingly, the conventional cooling system 200 provides a respective blower/motor 204 for each energy storage device 202 which draws in outside air from beneath the locomotive platform, thus including contaminants such as rocks, pebbles, dust and other debris from beneath the locomotive platform. Additionally, the conventional cooling system 200 provides an individual blower/motor 204, wire mesh 206 and exhaust vent 208 for each energy storage device 202.

Accordingly, it would be advantageous to provide a cooling system for the energy storage devices of a locomotive which improves the air quality of the incoming outside air to the cooling system. Additionally, it would be advantageous to provide a cooling system for the energy storage devices of a locomotive which minimizes the number of blowers/motors for easier control and maintenance of the cooling system.

BRIEF DESCRIPTION OF THE INVENTION

In one embodiment of the present invention, a system is provided for cooling an energy storage system of a hybrid electric vehicle. The energy storage system includes at least one energy storage device. The system includes an inlet positioned on the outer surface of the vehicle above a platform of the vehicle. Additionally, the system includes a cooling fluid duct in flow communication with the inlet and the at least one energy storage device. The system further includes a blower powered by a respective motor and positioned within the cooling fluid duct to draw cooling fluid into the inlet and through the cooling fluid duct to pass the cooling fluid over or through the at least one energy storage device and into a common vented area of the vehicle.

In one embodiment of the present invention, a method is provided for cooling an energy storage system of a hybrid electric vehicle. The energy storage system includes at least one energy storage device. The method includes positioning an inlet on the outer surface of the vehicle above the platform of the vehicle. Additionally, the method includes communicatively coupling a cooling fluid duct to the inlet and the at least one energy storage device, followed by positioning a blower powered by a motor within the cooling fluid duct. The method subsequently involves drawing cooling fluid into the inlet and through the cooling fluid duct, followed by passing the cooling fluid over or through the at least one energy storage device and into a common vented area of the vehicle.

In one embodiment of the present invention, computer readable media containing program instructions are provided for cooling an energy storage system of a hybrid electric vehicle. The energy storage system includes at least one energy storage device. The computer readable media includes a computer program code to selectively control the supply of cooling fluid into an inlet positioned on the outer surface of the vehicle above the platform of the vehicle and through a cooling fluid duct in flow communication with the inlet and each energy storage device. Additionally, the computer readable media includes a computer program code to selectively control the passage of the cooling fluid over or through the at least one energy storage device and into a common vented area of the vehicle.

BRIEF DESCRIPTION OF THE DRAWINGS

A more particular description of the embodiments of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which:

FIG. 5 is a cross-sectional side view and cross-sectional end view of an embodiment of a system for cooling an energy storage device of a hybrid electric vehicle;

FIG. 6 is a cross-sectional side view and cross-sectional end view of an embodiment of a system for cooling an energy storage system of a hybrid electric vehicle;

FIG. 7 is a cross-sectional side view and cross-sectional end view of an embodiment of a system for cooling an energy storage device of a hybrid electric vehicle;

FIG. 8 is a cross-sectional side view and cross-sectional end view of an embodiment of a system for cooling an energy storage device of a hybrid electric vehicle;

DETAILED DESCRIPTION OF THE INVENTION

Though exemplary embodiments of the present invention are described with respect to rail vehicles, specifically hybrid trains and locomotives having diesel engines, the exemplary embodiments of the invention discussed below are also applicable for other uses, such as but not limited to hybrid diesel electric off-highway vehicles, marine vessels, and stationary units, each of which may use a diesel engine for propulsion and an energy storage system with one or more energy storage devices. Additionally, the embodiments of the present invention discussed below are similarly applicable to hybrid vehicles, whether they are diesel-powered or non-diesel powered, including hybrid locomotives, hybrid off-highway vehicles, hybrid marine vehicles, and stationary applications. Yet further, the embodiments of the present application are applicable to any battery applications, whether or not such applications are performed on the hybrid powered vehicles described above. Additionally, although the embodiments of the present application discuss the use of outside air and cooling air drawn into an air inlet and through an air duct, any cooling fluid appreciated by one of skill in the art other than air may be utilized in place of the cooling air or outside air discussed in the embodiments of the present application.

Figure 1:
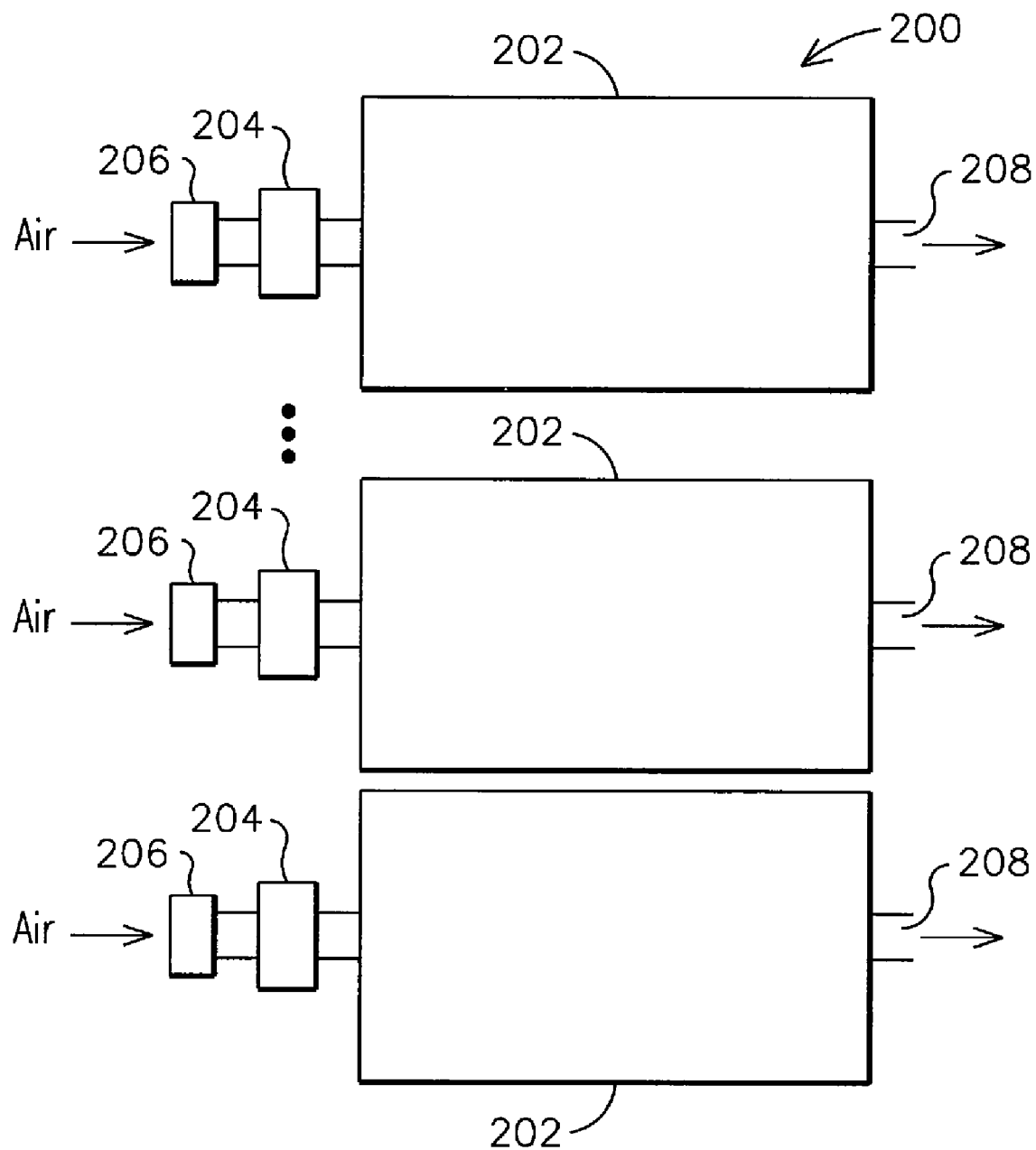
FIG. 1 is a cross-sectional top view of an embodiment of a conventional system for cooling an energy storage system of a hybrid electric vehicle.
Figure 2:
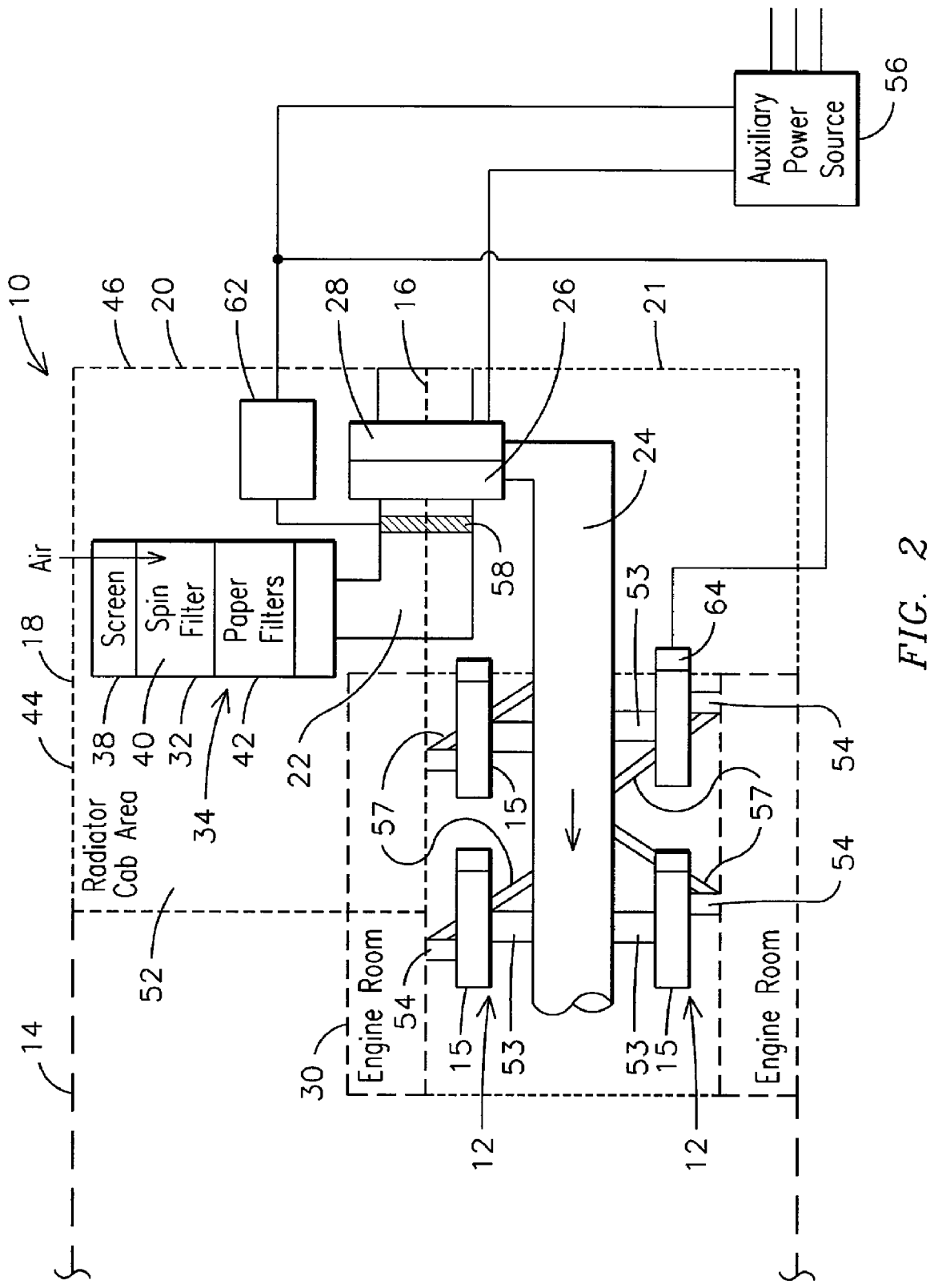
FIG. 2 is a cross-sectional plan view of an embodiment of a system for cooling an energy storage system of a hybrid electric vehicle.

FIG. 2 illustrates one embodiment of a system 10 for cooling an energy storage system 12 of a hybrid diesel electric locomotive 14. The energy storage system 12 illustratively includes a plurality of energy storage devices (i.e. batteries) 15 positioned below a platform 16 of the locomotive 14. Although FIG. 2 illustrates the energy storage devices 15 positioned below the platform 16, the energy storage devices 15 may be positioned above or on the locomotive platform 16, such as for a tender application, as appreciated by one of skill in the art, for example. In an exemplary embodiment of the system 10, the platform 16 of the locomotive 14 is positioned above the wheels of the locomotive and is substantially aligned with the floor of the operator cabin for each locomotive, as appreciated by one of skill in the art. However, the platform 16 may be aligned with other horizontal surfaces of the locomotive 14 other than the operator cabin.

In the illustrated exemplary embodiment of FIG. 2, the system 10 includes an air inlet 18 positioned on an outer surface 20 of the locomotive 14 above the platform 16 at a location relatively free from contamination, including diesel fumes, hot air exhaust, etc. The air inlet 18 is an opening in the outer surface 20 of the locomotive 14 adjacent to a radiator area 52 of the locomotive 14, with dimensions based upon the particular energy storage system 12 and the cooling air flow demand for each energy storage system. Although FIG. 2 illustrates the air inlet 18 positioned in an opening of the outer surface 20 adjacent to the radiator area 52, the air inlet 18 may be positioned in an opening of the outer surface 20 adjacent to any area of the locomotive, above the platform 16. In an additional exemplary embodiment, the air inlet 18 may be positioned at any location along the outer surface 20,21, above or below the locomotive platform 16, provided that the incoming outside air into the inlet 18 contains a minimum amount of contaminants. By positioning the air inlet 18 along the outer surface 20 of the locomotive 14 above the platform 16, outside air drawn into the air inlet includes a substantially less amount of contaminants relative to outside air adjacent to an outer surface 21 of the locomotive below the platform 16. Although FIG. 2 illustrates an air inlet 18 positioned on a roof portion 44 of the outer surface 20 of the locomotive 14, the air inlet may be positioned at any location along the outer surface 20 of the locomotive 14 above the platform 16, including at any location on the roof portion 44 or side portions 46 of the outer surface 20 above the platform 16. Additionally, although FIG. 2 illustrates one air inlet 18 positioned in the outer surface 20 of the locomotive 14 above the platform 16, more than one air inlet 18 may be positioned in the outer surface 20 of the locomotive 14.

As further illustrated in the exemplary embodiment of FIG. 2, filtering media 32 are positioned at a filtering location 34 adjacent to the air inlet 18 within an air inlet duct 22. The filtering media 32 assist in removing contaminants from the outside air drawn into the air inlet 18 before it enters the air inlet duct 22. Although FIG. 2 illustrates a variety of filtering media 32, including more than one filtering layers, such as a screen 38, a spin filter 40 and a paper filter 42, any type of filtering media may be utilized. Additionally, since the exemplary embodiment of the system 10 features placement of the air inlet 18 along the outer surface 20 of the locomotive above the locomotive platform 16, the amount of contaminants in the incoming outside air through the air inlet is relatively low, thereby minimizing the need for excessive filtering, and/or extending the life of filter and battery components. Screen filters 38 may be placed as a first filtering layer encountered by incoming outside air to remove large objects, such as leaves and paper, for example. Spin filters 40 may be placed as a second filtering layer for the incoming outside air to separate matter based upon density using an air spinning centrifuge device, for example. Additionally, paper filters 42 may be utilized as an additional filtering layer to collect additional particles from the outside air during the filtering process, for example. Since the exemplary embodiment of the system 10 features a single filtering location 34 for all filtering media 32, regular maintenance including regular replacement and/or cleaning of each filtering media may be conveniently accomplished at the single filtering location, as oppose to at multiple filtering locations.

As further illustrated in the exemplary embodiment of FIG. 2, the system 10 includes the air inlet duct 22 and an air duct 24 in flow communication with the air inlet 18. The filtering media 32 is disposed between the air inlet duct 22 and the air inlet 18. The air duct 24 is coupled to the air inlet duct 22 through a blower 26 and motor 28 (discussed below) and a damper control device 58 (discussed below). Although FIG. 2 illustrates a blower 26 and respective motor 28, each blower 26 may be directed driven by a mechanical source, or each blower 26 may be driven by a second blower which in turn may be driven by a mechanical source. While the air inlet duct 22 is illustratively positioned above the locomotive platform 16, the air duct 24 is illustratively positioned below the locomotive platform 16. However, the air inlet duct and air duct are not limited to being respectively positioned above and below the locomotive platform. Additionally, although FIG. 2 illustrates one air inlet duct and one air duct, more than one air inlet may be positioned along the outer surface, for which more than one respective air inlet duct and air duct may be utilized.

The air duct 24 illustrated in the exemplary embodiment of FIG. 2 passes along the length of the locomotive 14, and is in flow communication with each energy storage device 15 below the locomotive platform 16. Although FIG. 2 illustrates four energy storage devices positioned on opposite sides of the air duct, any number of energy devices may be in flow communication with the air duct, including on opposing sides of the air duct or on one side of the air duct, for example. Additionally, although FIG. 2 illustrates one air duct positioned below the locomotive platform 16, more than one air duct may be positioned below the platform, and thus more than one set of energy storage devices may be respectively in flow communication with each respective air duct.

As further illustrated in the exemplary embodiment of FIG. 2, the system 10 includes a blower 26 powered by a motor 28 positioned within the air inlet duct 22. During operation, upon supplying power to the motor 28 and activating the blower 26, the blower draws outside air from above the locomotive platform 16 into the air inlet 18, through the filtering media 32 at the single filtering location 34 and through the air inlet duct 22 and the air duct 24. The blower 26 subsequently passes the outside air over or through each energy storage device 15 and into a common vented area 30 of the locomotive 14. In the illustrated exemplary embodiment of FIG. 2, the common vented area 30 is an engine compartment area, which receives a substantial amount of heat from the locomotive engine, as appreciated by one of skill in the art. The blower 26 forces the outside air through a duct coupling 53 to pass the outside air over or through each energy storage device 15 and further draws the outside air through a respective vent coupling 54 to the engine compartment 30. The engine compartment 30 includes one or more pre-existing vents (not shown) along the outer surface of the locomotive 14, to exhaust the outside air outside the locomotive upon entering the engine compartment. Although FIG. 2 illustrates one blower and a respective motor, more than one blower and respective motor may be utilized within each air duct, or alternatively one blower and respective motor may be positioned within each of a plurality of air ducts, as discussed above. As illustrated in the exemplary embodiment of FIG. 2, a secondary duct 57 is illustratively coupled between the air duct 24 and each vent coupling 54 between each energy storage device 15 and the engine compartment area 30. The secondary duct 57 is provided to pass cooler outside air from the air duct 24 into each vent coupling 54, to blend the cooler outside air with hotter outside air having passed over or through each energy storage device 15 and into each vent coupling 54. Within each vent coupling 54, the cooler outside air from each air duct 24 blends with the hotter cooler air having passed over or through each energy storage device 15, thereby reducing the temperature of the outside air passed to the engine compartment area 30. Additionally, in an exemplary embodiment, a secondary duct 57 may be positioned to blend cooler outside air from the air duct 24 with a respective vent external to the locomotive (not shown). In the exemplary embodiment of utilizing the secondary duct, a greater amount of cooler outside air may be blended with the hotter outside air having passed over or through each energy storage device when the outside air is exhausted outside of the locomotive, as the outside air has a greater likelihood to come into human contact, thus presenting a safety issue if the temperature of the exhausted outside air is at an unacceptably high level.

As illustrated in the exemplary embodiment of FIG. 2, the system 10 includes a power source 56 to supply power to the blower 26 and motor 28. In the exemplary embodiment, the power source 56 is an auxiliary power source to supply power to the blower 26 and motor 26 to draw the outside air into the air inlet 18, through the filtering media 32, through the air inlet duct 22 and the air duct 24, to pass the outside air over or through each energy storage device 15 and into the common vented area 30 of the locomotive 14. In an exemplary embodiment, the blower 26 is operated continuously to avoid non-rotation of the blower motor for an extended period of time during operation of the locomotive 14 to prevent failure of a motor bearing of the blower 26 due to mechanical vibrations during the operation of the locomotive 14.

In addition to the power source 56, a damper control device 58 may be positioned within the air inlet duct 22 to selectively shut off the supply of outside air to the blower 26. The damper control device 58 may be controlled by a locomotive controller 62, and is switchable between an open (outside air supply flows to the blower 26) and closed (outside air supply is shut off to the blower 26) position. The locomotive controller 62 is illustratively coupled to the damper control device 58, and switches the damper control device between the open and closed position based upon the temperature of each energy storage device 15, which the locomotive controller reads from a respective temperature sensor 64, such as a thermometer, for example, of each energy storage device also coupled to the locomotive controller. Additionally, the locomotive controller 62 may switch the damper control device to an intermediate position between the open and closed position, to control the supply of outside air flowing to the blower 26. To maximize the efficiency of the system 10, the locomotive controller 62 may switch the damper control device 58 to the closed position, such that the blower continues to rotate (assuming the motor is receiving power) but no outside air is supplied to the blower, thereby minimizing any work done by the blower. In an exemplary embodiment, the operating temperature range of the energy storage device may be between 270-330 degrees Celsius, for example, however the locomotive controller may turn the damper control device to the closed position upon reading a minimum temperature of 270 degrees Celsius from each of the energy storage devices, and shut off the supply of outside air to the blower, thereby shutting off the cooling system, for example. The exemplary temperature range of 270-330 degrees Celsius is merely an example, and energy storage devices operate at varying temperature ranges. Additionally, the locomotive controller may turn the damper control device to the open position upon reading a maximum temperature of 300 degrees Celsius from each of the energy storage devices, and reopen the supply of outside air to the blower to recommence the cooling system, for example. Although FIG. 2 illustrates one power source and damper control device, more than one power source and more than one damper control device may be utilized. Although the illustrated power source 56 is an auxiliary power source, the motor 28 may be powered by a locomotive engine power source. The locomotive controller 62 is included in the illustrated exemplary embodiment of the system 10 to monitor a temperature sensor 64 coupled to each energy storage device 15. In addition to selectively operating the damper control system, the locomotive controller 62 may selectively operate a continuous speed blower, a multiple speed blower of the speed of the power source 56, a variable speed blower/direct driven blower or a switchable blower. The locomotive controller 62 may selectively operate each blower based upon comparing a monitored temperature from the temperature sensor 64 of each energy storage device 15 with a respective predetermined temperature threshold of each energy storage device 15 stored in the locomotive controller memory.

The blower 26 may be a continuous speed blower, a multiple speed blower of the speed of the power source 56, or a switchable blower including a switch to turn the blower on and off. For example, the multiple speed blower may operate at multiple speeds (i.e. ½, ¼, ⅛, etc) of the speed of the power source to the blower, or a variable speed drive like an inverted driven motor.

Figure 3:
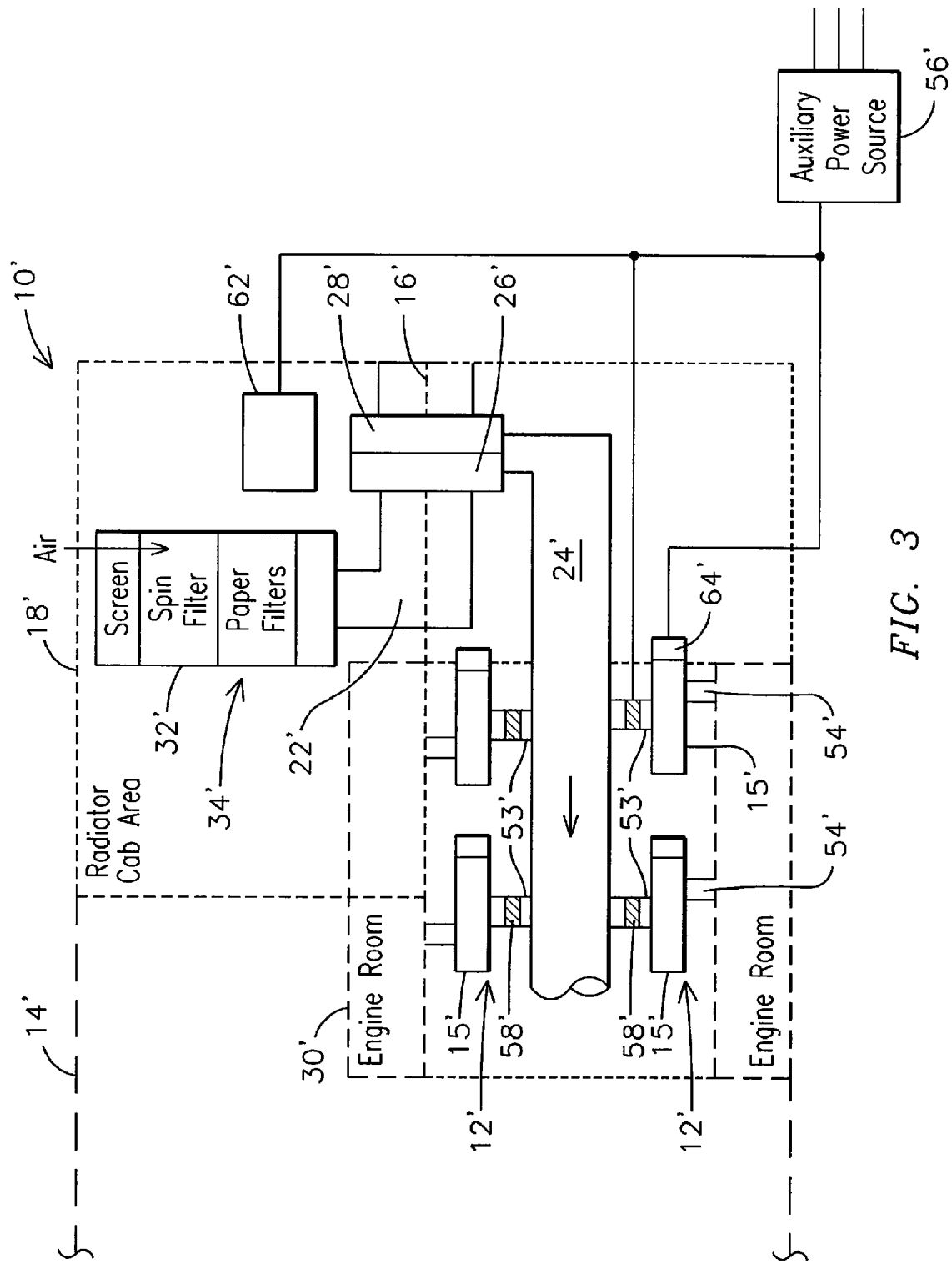
FIG. 3 is a cross-sectional plan view of an embodiment of a system for cooling an energy storage system of a hybrid electric vehicle.

FIG. 3 illustrates another embodiment of a system 10' for cooling an energy storage system 12'. The system 10' includes an air inlet duct 22' and air duct 24' in flow communication to the air inlet 18'. As illustrated in the exemplary embodiment of FIG. 3, the system 10' includes a power source 56' to controllably operate the blower 26' and motor 28'. In the exemplary embodiment, the power source 56' includes an auxiliary power source to controllably operate the blower 26' and motor 28' to draw the outside air into the air inlet 18', through the filtering media 32' and through the air inlet duct 22' and the air duct 24'. Upon passing through the air duct 24', the outside air passes through a respective damper control device 58' positioned within the duct coupling 53' from the air duct 24' to each energy storage device 15'. Each damper control device 58' is positioned within the duct coupling 53' adjacent to each energy storage device 15' to selectively shut off the supply of outside air to each energy storage device. Each damper control device 58' is controlled by the locomotive controller 62' to selectively shut off the supply of outside air over or through each energy storage device 15', through a respective vent coupling 54' and into a common vented area 30', such as the engine compartment, for example. Each damper control device 58' is switchable by the locomotive controller 62' between an open (outside air supply flows to each energy storage device 15') and closed (outside air supply is shut off to each energy storage device 15') position. Additionally, the controller 62' may switch the damper control device 58' to an intermediate position between the open and closed positions, to selectively control the supply of outside air provided to each energy storage device 15'. The locomotive controller 62' is illustratively coupled to each damper control device 58', and switches the damper control device between the open and closed position based upon the temperature of each energy storage device 15', which is read from a respective temperature sensor 64' of each energy storage device that is also coupled to the locomotive controller. In an exemplary embodiment, the operating temperature range of the energy storage device may be 270-330 degrees Celsius, however the locomotive controller may turn the damper control device to the closed position upon reading a minimum temperature of 270 degrees Celsius from each of the energy storage devices, and shut off the supply of outside air to the energy storage device. The example of a temperature range of 270-330 degrees Celsius is merely exemplary and energy storage devices may operate at varying temperature ranges. Additionally, the locomotive controller may turn the damper control device to the open position upon reading a minimum temperature of 300 degrees Celsius from each of the energy storage devices, and reopen the supply of outside air to each energy storage device. Although FIG. 3 illustrates one power source and one damper control device for each energy storage device, more than one power source and more than one damper control device for each energy storage device may be utilized. Although the illustrated power source 56' is an auxiliary power source, the motor 28' may be powered by a locomotive engine power source. Those other elements of the system 10' not discussed herein, are similar to those elements of the previous embodiments discussed above, without prime notation, and require no further discussion herein.

Figure 4:
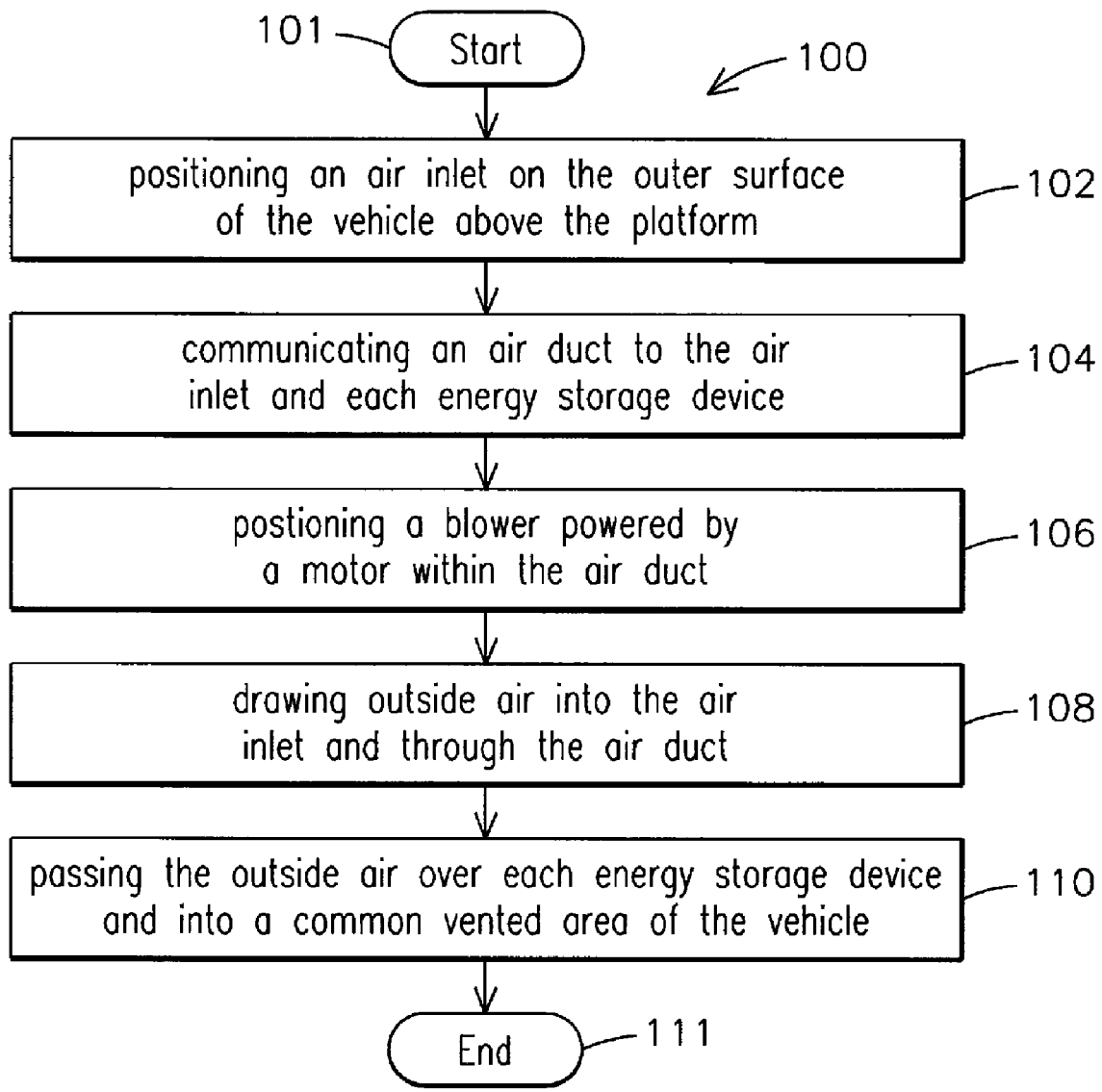
FIG. 4 is a flow chart illustrating an exemplary embodiment of a method for cooling an energy storage system of a hybrid electric vehicle.

FIG. 4 illustrates an exemplary embodiment of a method 100 for cooling an energy storage system 12 of a hybrid diesel electric locomotive 14. The energy storage system 12 includes a plurality of energy storage devices 15 positioned below a platform 16 of the locomotive 14. The energy storage devices 15 may be similarly positioned above the platform 16 of the locomotive or other vehicles 14. The method 100 begins (block 101) by positioning (block 102) an air inlet on the outer surface of the vehicle above the platform. More particularly, the method includes communicating (block 104) an air duct to the air inlet and each energy storage device. Additionally, the method includes positioning (block 106) a blower powered by a motor within the air duct. The method further includes drawing (block 108) outside air into the air inlet and through the air duct, followed by passing (block 110) the outside air over or through each energy storage device and into a common vented area of the vehicle, before ending at block 111.

The method may further include providing filtering media 32 at a filtering location 34 adjacent to the air inlet 18 within an air inlet duct 22 in flow communication to the air duct 24, where the filtering media 32 may include a filtering screen 38, a spin filter 40, a paper filter 42, and any other type of filtering media known to one of skill in the art. Additionally, the method may further include removing contaminants from the outside air before entering the air inlet duct 18. The method may further include positioning a damper control device 58 within the air inlet duct 22 to selectively shut off the supply of outside air to each energy storage device 15.

FIG. 5 illustrates an additional embodiment of a system 310 for cooling an energy storage system 312, where the energy storage system 312 includes one or more energy storage devices 315. Although FIG. 5 illustrates one energy storage device, the system 310 may be utilized with a plurality of energy storage devices 315, as illustrated in FIG. 6.

The system 310 illustratively includes an inner casing 320 configured to encapsulate an inner core 322 of the energy storage device 315 of the energy storage system 312. The inner core 322 of the energy storage device 315 essentially includes all components of the energy storage device, with the cooling air ducts, inlets and outlets removed. The inner casing 320 forms an air-tight containment around the inner core 322 of the energy storage device 315, and may be a heavy-duty box, for example. The inner casing 320 may be formed from a suitable metallic material, for example stainless steel. All of the inner core 322 components of the energy storage device, including the internal electronics of the energy storage device 315, are contained within the inner casing 320. The system 310 further illustratively includes an outer layer 324 configured to surround the inner casing 320. The outer layer 324 may be an insulative layer made from an insulation material, such as WDS, for example. A pair of mounting brackets 323 pass through the outer layer 324, and are coupled to the inner casing 320 adjacent to opposing end surfaces 333,334 of the inner core, to spatially suspend the inner casing 320 within the outer layer 324. FIG. 6 illustrates a inner core 320 configured to encapsulate two inner cores 322 of two energy storage devices 315, and an outer layer 324 configured to surround the inner casing 320. The illustrated exemplary embodiment of FIG. 6 shows a double stacked arrangement of the inner casings, but this multiple arrangement could be any multiple stacking of inner casing, such as side-to-side, for example. The inner casing 320 is not completely contained, as various components of the inner core 322, such as temperature sensors, for example penetrate the inner casing 320.

In between the outer layer 324 and the inner casing 320 is an inner space 326 which is configured to receive cooling fluid 328 through an inlet 318 in the outer layer 324. As illustrated in the end-view of FIG. 5, the inner space 326 surrounds the inner casing 320, which is attributed to the spacing of the outer layer 324 around the inner casing 320, although the outer layer 324 may have varying spacing from the inner casing 320. Additionally, FIG. 5 illustrates an outlet 336 in the outer layer 324, which is positioned adjacent to the inlet 318, however the outlet 336 may be positioned at nay location along the outer layer 324. Although FIG. 5 illustrates one inlet and one outlet in the outer layer, more than one inlet and outlet may be positioned within the outer layer 324.

As illustrated in FIG. 5, the inner casing 320 is a rectangular-shaped casing with six external surfaces 329,330,331, 332,333,334, including four side surfaces 329,330,331,332 and two end surfaces 333,334. Although the inner casing illustrated in FIG. 5 is a rectangular-shaped casing, the inner casing may take any shape, provided that outside air remains contained off from entering the interior of the inner core during convection of the outside air along the external surfaces of the inner casing 320.

As illustrated in the exemplary embodiment of FIG. 7, the inner casing 320 further includes an inner insulative layer 337 along any of the external surfaces of the inner casing, such as the bottom surface 332 illustrated in FIG. 7. Thus, the inner insulative layer 337 may cover a four-sided, two-sided, or any such multiple or single sided external surface of the inner casing. The inner insulative layer 337 is configured to control convection of the cooling fluid 328 along the bottom external surface 332 within the inner space 326. In the exemplary embodiment of FIG. 7, the bottom external surface 332 may be in more intimate contact with the inner cells of the energy storage device proximate to the bottom external surface 332, and thus the heat transfer properties of the bottom external surface 332 may be greater than the other external surfaces, resulting in an imbalance of convection of the bottom external surface with outside air within the inner space 326, as compared to the other external surfaces. Accordingly, by positioning the inner insulative layer 337 along the bottom external surface 332, the convection of outside air along each external surface of the inner casing 320 may be balanced out. As illustrated in the additional exemplary embodiment of FIG. 8, an inner insulative layer 337 may be positioned along three (i.e. more than one) external surfaces 329,330,331 of the inner casing 320, also to balance the convection of cooling fluid 328 within the inner space 326 among the external surfaces. Although FIGS. 7 and 8 illustrate inner insulative layers 337 of constant thickness between external surfaces and along each external surface, the inner insulative layer may have a varying thickness among external surfaces and a varying thickness along a single external surface, in order to stabilize the respective convection of cooling fluid along each respective external surface.

As illustrated in FIG. 5, a controllable outlet 341 is positioned within the outer layer 324. The controllable outlet 341 illustratively is a movable gate and is configured to selectively open and close the outlet 336 to control a flow of cooling fluid 328 within the inner space 326. Although FIGS. 5, 7-8 illustrate a movable gate, the controllable outlet may take several different forms which selectively open and close the outlet. Additionally, a controller 342 is coupled to the controllable outlet 341 and includes a stored maximum temperature threshold and minimum temperature threshold in a memory 344. The maximum and minimum temperature threshold are the maximum and minimum temperature thresholds represent the maximum and minimum temperatures for which the cooling system respectively turns on and off. However, the system does not require any such maximum and minimum temperature thresholds. The controller 342 is configured to monitor the temperature of the inner core 320. The controller 342 is configured to close the controllable outlet 341 (i.e. close the movable gate) to cease the flow of cooling fluid 328 within the inner space 326 upon determining that the temperature of the inner core 320 is less than the minimum temperature threshold stored in the memory 344. In the event that the controller 342 closes the controllable outlet 341 and shuts off the flow of cooling fluid 328, the outer insulative layer 324 serves to insulate the cooling fluid 328 within the inner space 326, and thus stabilizes the temperature of the cooling fluid 328 and the inner core 320 of the energy storage device 315 to achieve a thermal equilibrium. If the outer insulative layer 324 did not stabilize the temperature of the cooling fluid 328 with the temperature of the inner core 320, the inner core 320 would constantly lose heat energy from constantly heating up the cooling fluid 328, and would eventually require an unintended heating cycle. The controller 342 is configured to open the controllable outlet 341, and initiate a flow of cooling fluid 328 within the inner space 326, upon the controller 342 determining that the temperature of the inner core 320 is greater than the maximum temperature threshold stored in the memory 344. In an exemplary embodiment, the controllable inlet 318 and controllable outlet 341 may be a movable gate which may selectively open and closed by the controller 342 to control the flow of cooling fluid 328 into the inner space 326, for example. Upon the controller 342 initiating a flow of cooling fluid 328 within the inner space 326, each external surface 329,330,331,332,333, 334 of the inner casing 320 is configured to engage in convection with the cooling fluid 328 received through the inlet 318. In an exemplary embodiment of the system 310, the flow of cooling fluid 328 into the inlet 318 is based upon the motion of the locomotive, and thus the cooling fluid 328 enters the inner space 326 when the inlet 318 is open and the locomotive is in motion. A scoop device (not shown) may be attached external to the inlet 318 to assist in directed outside air into the inner space 326 during motion of the locomotive. However, the flow of cooling fluid 328 may be independent of the motion of the locomotive, and instead be assisted by a blower powered by a motor and positioned adjacent to the each inlet, for example.

Figure 9:
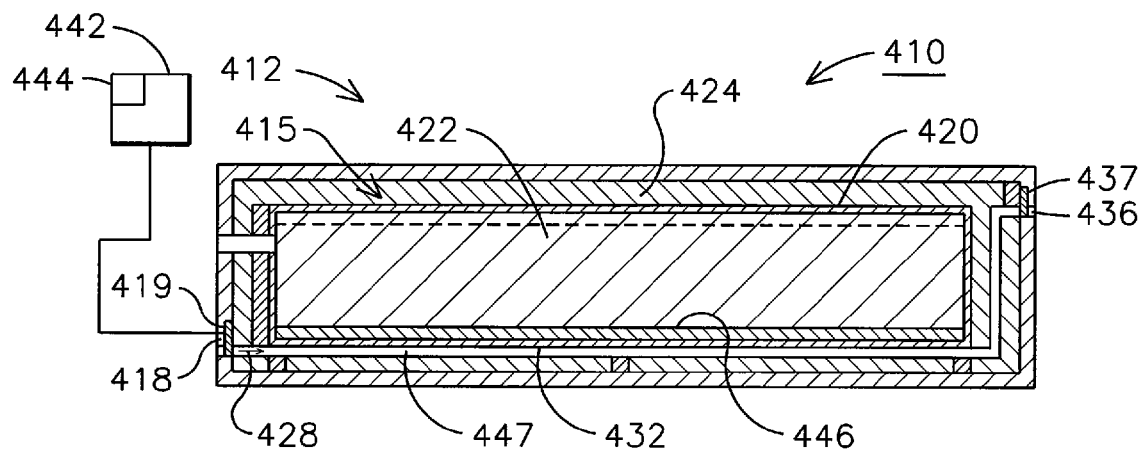
FIG. 9 is a cross-sectional side view of an embodiment of a system for cooling an energy storage device of a hybrid electric vehicle.
Figure 10:
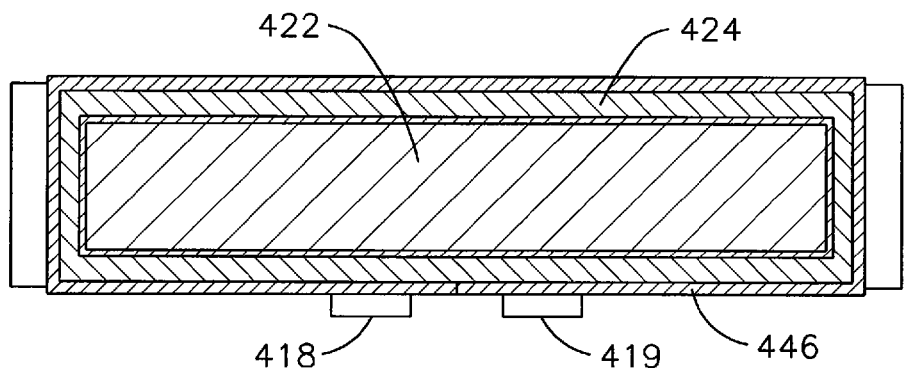
FIG. 10 is a cross-sectional top view of an embodiment of a system for cooling an energy storage device of a hybrid electric vehicle.

FIG. 9 illustrates an additional embodiment of a system 410 for cooling an energy storage system 412 of a hybrid diesel electric locomotive. The energy storage system 412 includes one or more energy storage devices 415. Although FIG. 9 illustrates one energy storage device 415, the system 410 may be utilized with a plurality of energy storage devices 415. The system 410 illustratively includes an inner casing 420 configured to encapsulate an inner core 422 of an energy storage device 415 of the energy storage system 412. The inner core 422 of the energy storage device 415 essentially includes all components of the energy storage device, with the cooling air ducts, inlets and outlets removed. The inner casing 420 forms an air-tight containment around the inner core 422 of the energy storage device 415. All of the inner core 422 components of the energy storage device, including internal electronics, are contained within the inner casing 420.

Additionally, the system 410 includes a heat transfer surface 446 configured to thermally engage the bottom external surface 432 of the inner casing 420. The heat transfer surface 446 is illustratively positioned within the inner casing 420 and adjacent to the bottom external surface 432. The heat exchange surface 446 is configured to extract heat energy from within the inner core 422 to the heat exchange surface 446, for subsequent transfer of the extracted heat energy to cooling fluid during convection (discussed below). Although FIG. 9 illustrates the heat exchange surface 446 positioned within the inner casing 420 and along the bottom external surface 432 of the inner casing 420, the heat exchange surface may be positioned external to the inner casing and along the bottom external surface of the inner casing 420. Additionally, although FIG. 9 illustrates the heat exchange surface positioned along the bottom external surface of the inner casing, the heat exchange surface may be positioned along any external surface of the inner casing, or more than one external surface of the inner casing, provided that certain parameters are met related to the positioning of the inlet and the outlet of the cooling system, as described below. The heat exchange surface 446 may be one of a conducting material and a heat sink material, for example, or any material capable of extracting heat energy from the interior of the inner core for subsequent convection with cooling fluid, as described below. Additionally, a heat transfer liquid may be utilized in place of the heat exchange surface 446 within the inner casing 420 and within the inner core 422, to promote heat transfer to an external surface, such as the bottom external surface 432, for example.

As further illustrated in FIG. 9, an outer layer 424 is configured to surround each inner casing 420. The outer layer 424 may be an insulative layer made from an insulation material, such as WDS and/or VAC, for example. An inlet 418 is illustratively positioned within the outer layer 424 and is configured to receive cooling fluid 428 within an cooling duct 447. The cooling duct 447 is configured to facilitate convection of the cooling fluid 428 with the heat exchange surface 446 adjacent to the bottom external surface 432. Since the heat exchange surface 446 has extracted the heat energy from within the inner core 422, the heat exchange surface heats up while the interior of the inner core 422 cools down. The cooling fluid 428 thermally engages the heat exchange surface 446 during motion of the locomotive, as the motion of the locomotive forces the cooling fluid into the inlet 418. Subsequent to the cooling fluid 428 undergoing convection with the heat exchange surface 446, the cooling fluid 428 passes through an outlet 436 positioned above the inlet 418. Since the outlet 436 is positioned above the inlet 418, the natural convection (i.e. chimney effect) of the cooling fluid 428 is facilitated. Accordingly, if the heat exchange surface 446 was repositioned to an alternate external surface of the inner casing 420, the outlet may need to be repositioned, based on the repositioning of the cooling duct and the inlet, to ensure that the height difference of the outlet above the inlet is maintained. Although FIG. 9 illustrates one inlet and one outlet within the outer layer 424, more than one inlet, outlet and cooling duct may be utilized.

FIG. 9 illustrates a controllable inlet 419 positioned in the outer layer 424 and configured to selectively open and close the inlet 418 to control a flow of cooling fluid 428 within the cooling duct 447. A controller 442 is illustratively coupled to the controllable inlet 419 with a stored minimum and maximum temperature threshold in a memory 444. The maximum and minimum temperature thresholds are the maximum and minimum temperature thresholds represent the maximum and minimum temperatures for which the cooling system respectively turns on and off. However, the system 410 does not require any such maximum and minimum temperature thresholds to operate. The controller 442 is configured to monitor a temperature of the inner core 422. FIG. 9 further illustrates a controllable outlet 437 in the outer layer 424 positioned above the controllable inlet 419 and configured to selectively open and close with the controllable inlet 419. In an exemplary embodiment, the controllable inlet and controllable outlet may be a movable gate which may be selectively open and closed by the controller to control the flow of cooling fluid into the inner space, for example, but other mechanisms to selectively open and close the respective inlets and outlets may be utilized. The controller 442 is configured to close the inlet 418, and cease the flow of cooling fluid 428 within the cooling duct 447 upon the controller 442 determining that the inner core 422 temperature is less than the minimum temperature threshold.

In the event that the controller ceases the flow of cooling fluid 428 within the cooling duct 447, the outer insulative layer 424 is configured to insulate the cooling fluid 428 with the cooling duct 447 and thus stabilize the temperature of the cooling fluid 428 and the inner core 422 of the energy storage device 415 to achieve a thermal equilibrium. The controller 442 is configured to open the inlet 418, and initiate a flow of cooling fluid 428 within the cooling duct 447 upon the controller 442 determining that the inner core 422 temperature is greater than the maximum temperature threshold.

Figure 11:
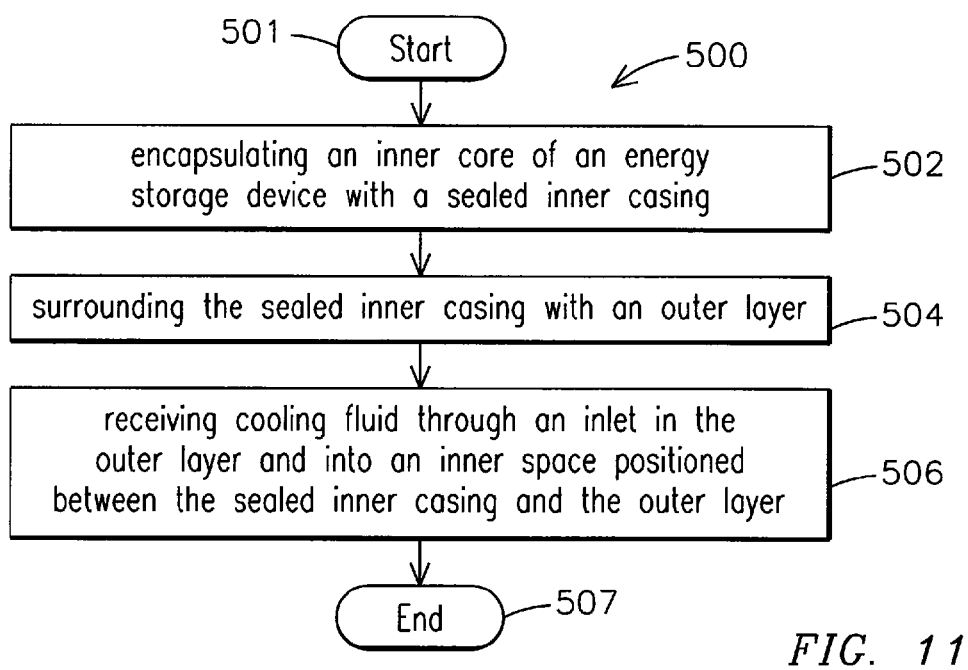
FIG. 11 is an exemplary embodiment of a method for cooling an energy storage system of a hybrid electric vehicle.

FIG. 11 illustrates an exemplary embodiment of a method 500 for cooling an energy storage system 312 of a hybrid diesel electric vehicle, where the energy storage system 312 includes one or more energy storage devices 315. The method 500 begins (block 501) by encapsulating (block 502) an inner core 322 of an energy storage device 315 with an inner casing 320, followed by surrounding (block 504) the inner casing 320 with an outer layer 324. The method further includes receiving (block 506) cooling fluid through an inlet 318 in the outer layer 324 and into an inner space 326 positioned between the inner casing 320 and the outer layer 324.

Figure 12:
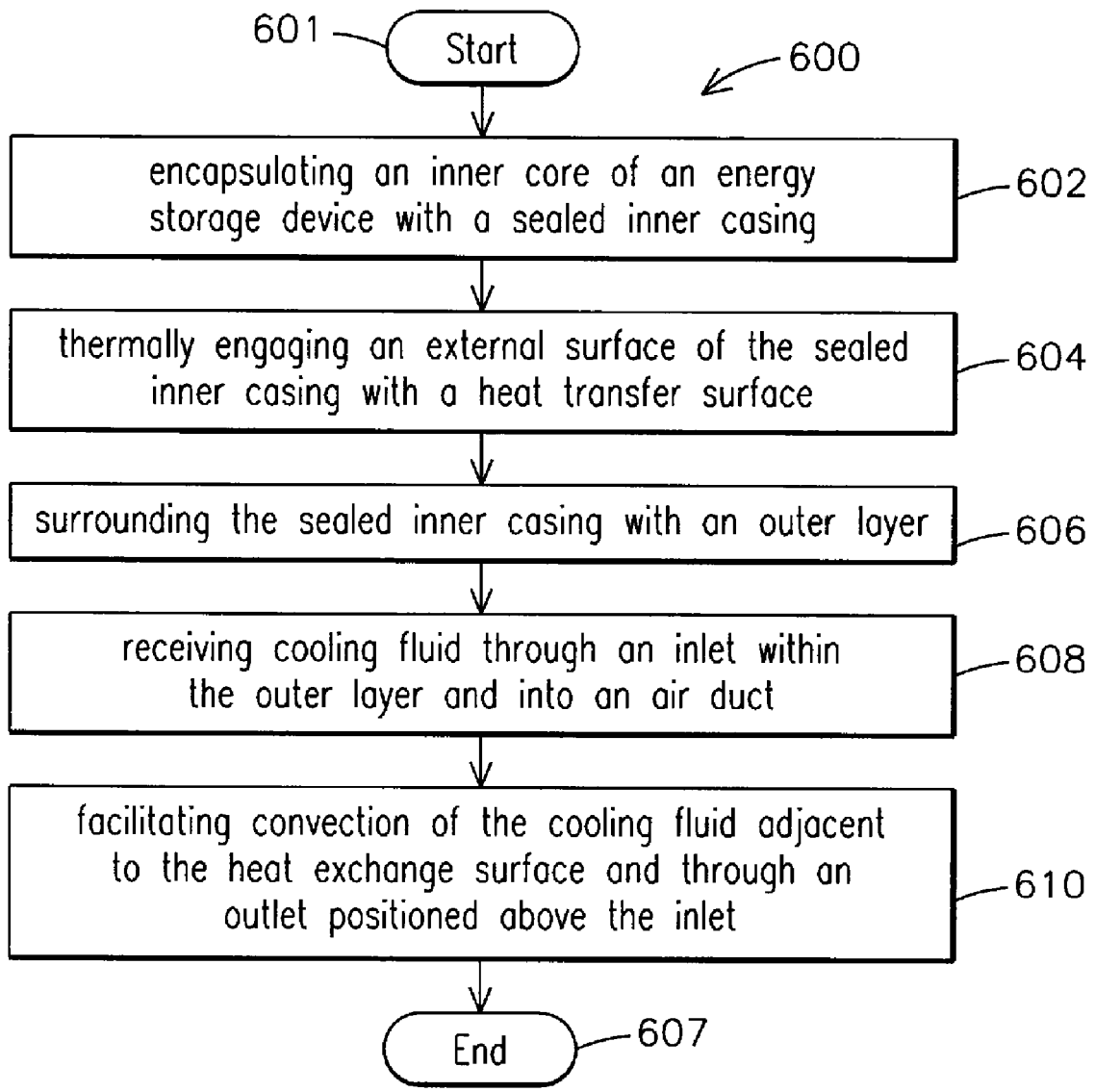
FIG. 12 is an exemplary embodiment of a method for cooling an energy storage system of a hybrid electric vehicle.

FIG. 12 illustrates an exemplary embodiment of a method 600 for cooling an energy storage system 412 of a hybrid diesel electric vehicle, where the energy storage system 412 includes one or more energy storage devices 415. The method 600 begins (block 601) by encapsulating (block 602) an inner core 422 of an energy storage device 415 with an inner casing 420. The method 600 further includes thermally engaging (block 604) an external surface 432 of the inner casing 420 with a heat transfer surface 446. The method 600 further includes surrounding (block 606) the inner casing 420 with an outer layer 424, and receiving (block 608) cooling fluid 428 through an inlet 418 within the outer layer 424 and into an cooling duct 447. The method further includes facilitating convection (block 610) of the cooling fluid 428 adjacent to the heat exchange surface 446 and through an outlet 436 positioned above the inlet 418.

Figure 13:
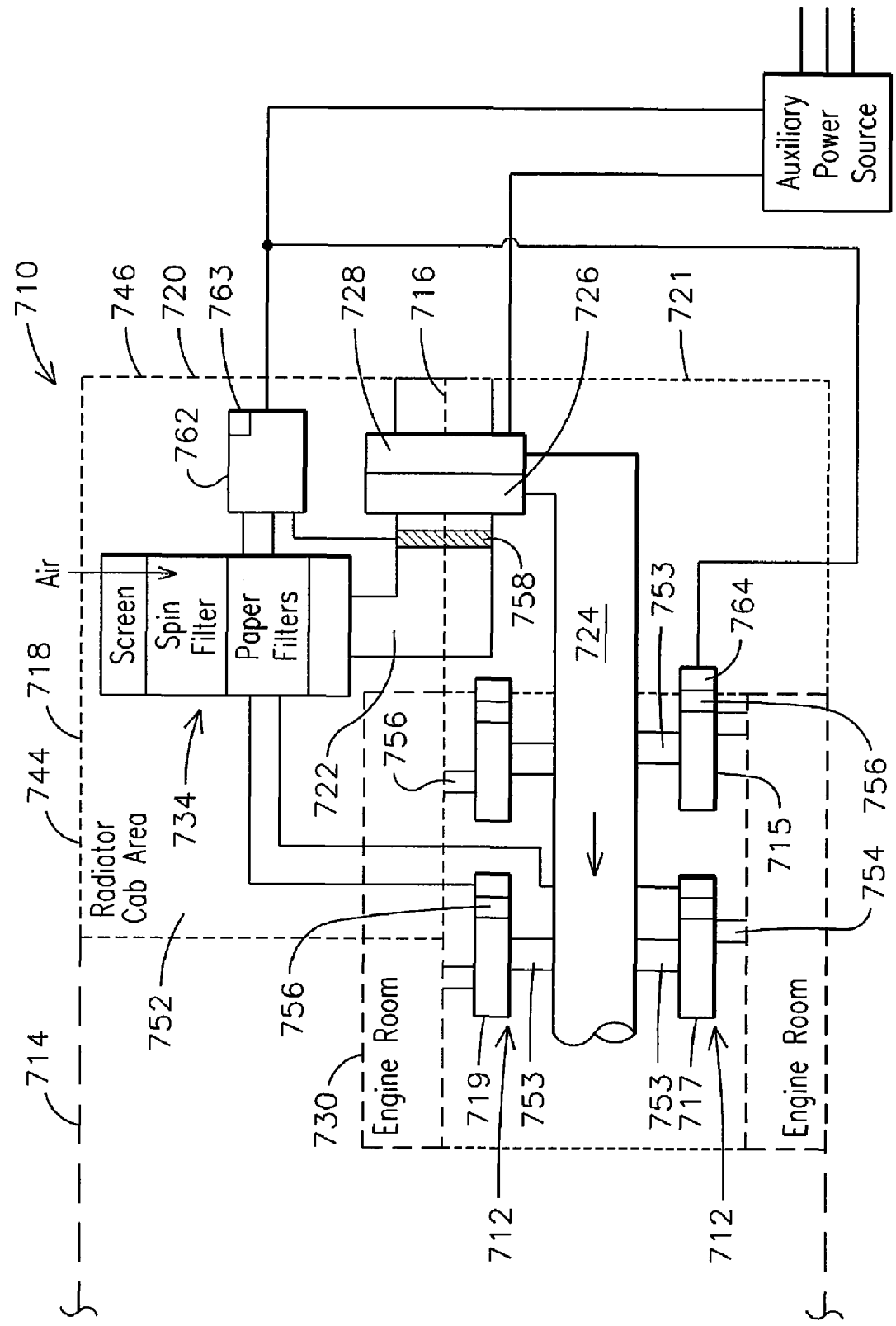
FIG. 13 is a cross-sectional side view of an embodiment of a system for cooling an energy storage system of a hybrid electric vehicle.

FIG. 13 illustrates an embodiment of a system 710 for cooling an energy storage system 712 of a hybrid diesel electric locomotive 714. The energy storage system 712 illustratively includes a plurality of energy storage devices 715, including a maximum temperature storage device 717 having a maximum temperature 721 and a minimum temperature storage device 719 having a minimum temperature 723 among the energy storage devices. Although FIG. 13 illustrates the energy storage devices 715 positioned below a locomotive platform 716, the energy storage devices 715 may be positioned on or above the locomotive platform 716. The exemplary embodiment of the system 710 illustrated in FIG. 13 further includes an air duct 724 in flow communication with an air inlet 718 and each energy storage device 715. The air inlet 718 is in the exemplary embodiment of FIG. 13 is positioned along the outer surface 720 of the locomotive 714 and above the locomotive platform 716, but may be positioned at any location along the outer surface, either above or below the locomotive platform 716. Additionally, the system 710 includes a blower 726 positioned within the air duct 724 to draw outside air into the air inlet 718 and through the air duct 724 to pass the outside air over or through each energy storage device 715.

Additionally, as illustrated in the exemplary embodiment of FIG. 13, the system 710 further includes a controller 762 coupled with each energy storage device 715. The controller 762 may be coupled to a respective temperature sensor 764 of each energy storage device 715. The controller 762 is configured to increase the temperature of each energy storage device 715 whose temperature is below the maximum temperature 721 reduced by a predetermined threshold stored in a memory 763 of the controller 762. For example, if the maximum temperature storage device 717 has a maximum temperature 721 of 300 degrees Celsius, and the stored predetermined threshold in the memory 763 of the controller 762 is 15 degrees Celsius, the controller 762 proceeds to increase the temperature of each energy storage device 715 having a temperature less than 285 degrees Celsius, using one a variety of heat sources, as described below. However, the exemplary embodiment of a maximum temperature storage device 717 with a maximum temperature of 300 degrees Celsius is merely an example and the maximum temperature storage device 717 may have any maximum temperature 721 value. The controller 762 illustrated in the exemplary embodiment of FIG. 13 is configured to monitor the temperature of each energy storage device 715, such that the controller activates the blower 726 when the temperature of an energy storage device 715 exceeds the maximum temperature threshold. Additionally, the controller deactivates the blower 726 when the temperature of an energy storage device 715 falls below the minimum temperature threshold.

Although FIG. 13 illustrates one air duct communicatively coupled to one air inlet, one blower positioned within the air duct, and one controller coupled to each energy storage device, more than one air duct may be communicatively coupled to a respective inlet, more than one blower may be respectively positioned within each air duct, and more than one controller may be coupled to each energy storage device.

Figure 14:
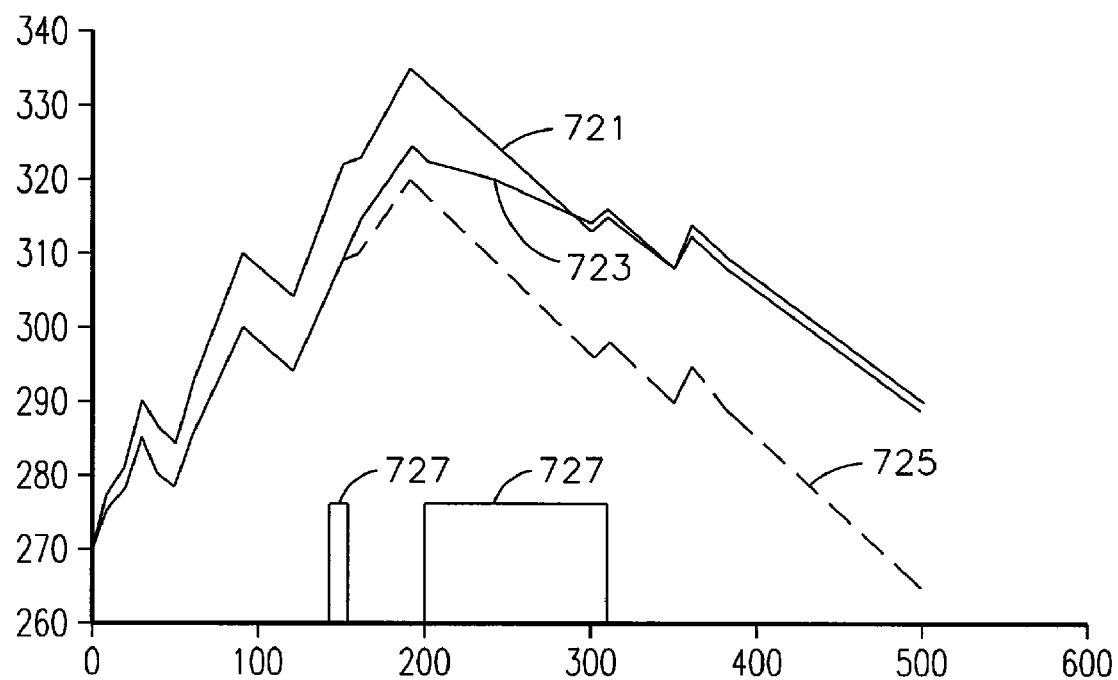
FIG. 14 is a timing diagram illustrating an embodiment of a maximum temperature and minimum temperature of a maximum temperature storage device and minimum temperature storage device of an embodiment of a cooling system for an energy storage system.

FIG. 14 illustrates an exemplary timing diagram of the maximum temperature 721 and minimum temperature 723 of the respective maximum temperature storage device 717 and minimum temperature storage device 719 of the energy storage system 712. As illustrated in the exemplary timing diagram of FIG. 14, at approximately t=150, the controller 762 proceeds to increase the temperature of the minimum storage device 719, as indicated by the on/off heating waveform 727 of the controller, representative of a signal from the controller 762 to a heat device 756 of the minimum temperature storage device 719, to heat the minimum temperature storage device, as discussed below. In the exemplary embodiment of FIG. 14, the controller 762 is configured to increase the temperature of the minimum temperature storage device 719 having the minimum temperature 723, since the minimum temperature 723 at t=150 is less than the maximum temperature 721 reduced by a predetermined threshold stored in the memory 763, such as 10 degrees, for example. The controller 762 is configured to increase the temperature of the minimum temperature storage device 719 (and any energy storage device 715 which meets the proper criteria) to within a predetermined range, such as 5 degrees Celsius, for example, of the maximum temperature 721. In the exemplary embodiment of FIG. 14, the controller 762 increases the temperature of the minimum temperature storage device 719 periodically until approximately t=310, when the minimum temperature 723 is within a predetermined range, such as 5 degrees Celsius, for example, of the maximum temperature 721. The controller 762 may manually increase the temperature of each energy storage device 715 which meets the above criteria, based on manually assessing the temperature difference between the temperature of each energy storage device and the maximum temperature 721 with the temperature threshold at each time increment. As illustrated in FIG. 14, if the controller 762 were not to increase the temperature of the minimum temperature storage device 719, the minimum temperature 723 curve would instead have taken the alternative minimum temperature 725 curve illustrated in FIG. 14, and the operating range of the energy storage system, measured by the temperature difference between the maximum temperature 721 and the minimum temperature 725 would be noticeably greater than the reduced operating range of the temperature difference between the maximum temperature 721 and the minimum temperature 723. In the exemplary timing diagram of FIG. 14, the time rate of change of the maximum temperature 721 and minimum temperature 723 is dependent on the blower speed 726, an energy load on each energy storage device 715 and an ambient temperature of each energy storage device 715.

As discussed above, when the controller 762 increases the temperature of an energy storage device, the controller 762 is configured to activate a heat device 756, such as a heating circuit, for example, of each energy storage device 715. The controller 762 supplies heat energy from the traction motors of the locomotive 714 to each heat device 756 during a dynamic braking mode of the locomotive. However, in an exemplary embodiment, the controller 762 may be configured to activate the heat device 756, such as a heating circuit, for example, of each energy storage device 715, with heat energy supplied from a locomotive engine during a motoring mode or idle mode of the locomotive, for example.

Within the memory 763 of the controller 762, the identity of particular energy storage devices 715 having a history of consistently lower temperatures relative to the other energy storage devices may be stored. During operation of the system 710, the controller 762 may be configured to increase the temperature of those previously identified energy storage devices 715 stored in the memory 763 with a previous history of low temperature, from below the maximum temperature 721 reduced by the predetermined threshold to greater than the maximum temperature 721 increased by a predetermined range. Thus, the controller 762 is configured to overcorrect for those energy storage devices 715 having a previous history of lower temperature by heating those energy storage devices 715 beyond the maximum temperature 721 in anticipation that their temperature will fall lower than expected. The controller 762 is configured to increase the temperature of the energy storage devices 715 identified with a previous history of low temperature during a dynamic braking mode with heat energy supplied from the traction motors, but may increase their temperature during a motoring mode or idle mode with heat energy supplied from the locomotive engine.

The controller 762 is configured to preheat the temperature of each energy storage device 715 with a temperature lower than the maximum temperature 721 reduced by the predetermined threshold to within a predetermined range of the maximum temperature. For example, the controller 762 may preheat the temperature of an energy storage device 715 from a temperature of 280 degrees Celsius, lower than the maximum temperature of 330 degrees Celsius reduced by a predetermined threshold of 10 degrees Celsius, to 325 degrees Celsius, or to within a predetermined range of 5 degrees of the maximum temperature of 330 degrees. The controller 762 is configured to preheat each energy storage device 715 during a dynamic braking mode and prior to the termination of a dynamic braking mode of the locomotive.

In addition to preheating an energy storage device, as discussed above, the controller 762 may be additionally configured to precool the temperature of each energy storage device 715 from a temperature above the minimum temperature 723 raised by the predetermined threshold to within a predetermined range of the minimum temperature. For example, the controller 762 may precool an energy storage device from a temperature of 320 degrees Celsius, since this temperature is above a minimum temperature of 270 degrees Celsius raised by a predetermined threshold of 10 degrees Celsius, and the controller 762 may precool the energy storage device to 275 degrees Celsius, or to within a predetermined range of 5 degrees Celsius of the minimum temperature of 270 degrees Celsius. The controller 762 may be configured to precool each energy storage device 715 prior to an encountering an upcoming anticipated dynamic braking mode, since an upcoming opportunity to heat the energy storage devices is imminent.

Each energy storage device 715 has a state of charge, and the controller 762 is configured to preheat the temperature of each energy storage device 715. The preheating may be based on state of charge. The description above is based on previous history, it is also possible to obtain a transfer function of the heat dissipation/temperature excursion based on the state of charge of the storage device (for example high SOC devices tend to transfer heat faster, while low SOC devices may be heated to compensate for the differing temperature). Another option is that the optimum operating temperature of each energy storage device is a function of the SOC. Accordingly, the difference in the SOC may be adjusted instead of the temperature difference between the maximum temperature storage device and minimum temperature storage.

Figure 15:
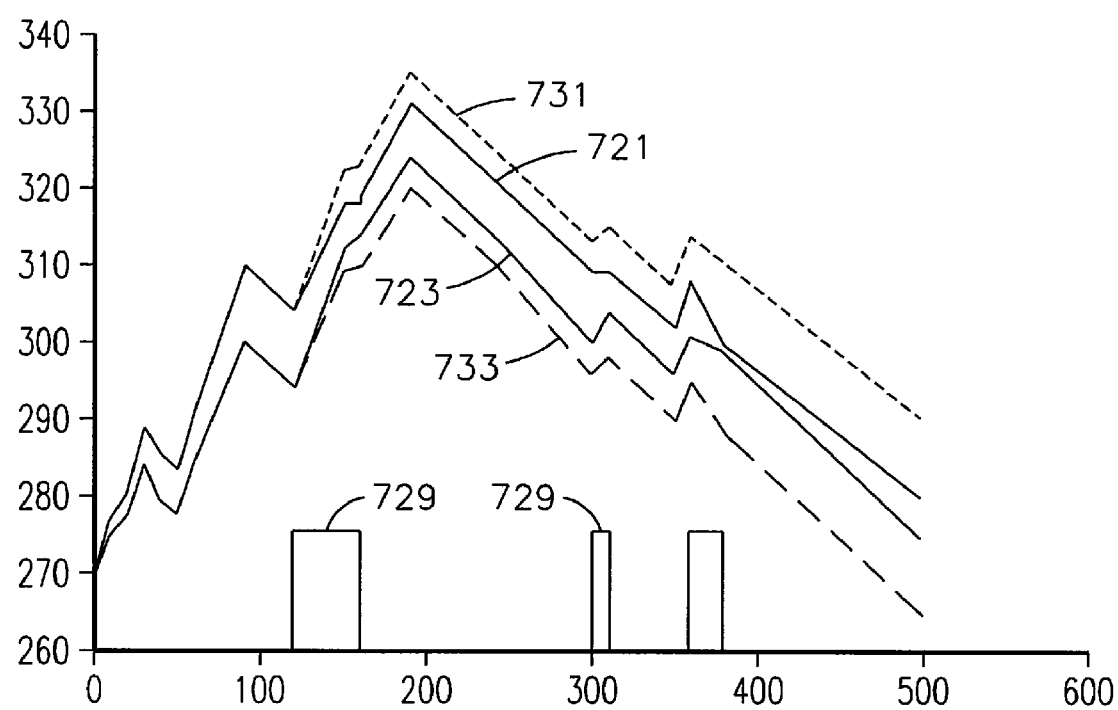
FIG. 15 is a timing diagram illustrating an embodiment of a maximum temperature and minimum temperature of a maximum temperature storage device and minimum temperature storage device of an embodiment of a cooling system for an energy storage system.

FIG. 15 illustrates an additional embodiment of the system 710, in which the controller 762 is configured to disconnect each energy storage device 715 from the energy storage system 712 having a temperature above the maximum temperature 721 lowered by the predetermined threshold. Upon disconnecting each of the energy storage devices 715 which meet the above criteria, the controller 762 is configured to increase the temperature of each energy storage device 715 with a temperature lower than the maximum temperature 721 reduced by the predetermined threshold. In an exemplary embodiment, if the maximum temperature is 300 degrees Celsius, the minimum temperature is 270 degrees Celsius, and the predetermined threshold is 10 degrees Celsius, the controller 762 is configured to disconnect each energy storage device 715 with a temperature above 290 degrees Celsius and is further configured to increase the temperature of each energy storage device 715 with a temperature lower than 290 degrees Celsius. In an additional exemplary embodiment, the controller may be configured to disconnect the maximum temperature storage device 717 and increase the temperature of the minimum temperature storage device 719. The controller 762 is configured to disconnect each energy storage device 715 with the previously discussed criteria and increase each energy storage device 715 with the previously discussed criteria during a low power demand on each energy storage device. The low power demand on each energy storage device 715 may take place during a dynamic or brake propulsion mode of the locomotive 714 For example, if the locomotive 714 demands 400 HP in secondary energy from 40 energy storage devices, thus amounting to 10 HP per energy storage device, if the controller 762 disconnects 20 energy storage devices with the hottest temperatures, the remaining 20 energy storages devices will necessarily take on twice their previous load, or 20 HP each, thereby increasing their respective temperature. Accordingly, the controller 762 is configured to increase the temperature of each energy storage device 715 meeting the above criteria by increasing the power demand on each energy storage device 715. However, the controller 762 may increase the temperature of the energy storage devices from the energy storage system using methods other than increasing the respective loads of each energy storage device. During a dynamic braking mode, the heat energy may be supplied from the traction motors, which is then supplied to the respective heating devices 756 of each energy storage device 715. Alternatively, the low power demand on each energy storage device 715 may take place during a motoring mode or idle mode, in which case the heat energy supplied to each respective heating device 756 may come from the locomotive engine.

As illustrated in the exemplary timing diagram of FIG. 15, the controller 762 disconnects the maximum temperature storage device 717 from the energy storage system 712 at approximately t=100, since the maximum energy 721 exceeds the maximum energy reduced by the predetermined threshold. At the same time, the controller 762 begins to increase the temperature of the minimum temperature storage device 719, since the minimum temperature 723 is lower than the maximum temperature 721 reduced by the predetermined threshold (e.g. 10 degrees Celsius). Although the maximum temperature storage device 717 is disconnected from the energy storage system 712, the maximum temperature 721 remains tracked by the controller 762 and plotted in FIG. 15. The activation of the heating device 756 within the minimum temperature storage device 719 is depicted by the waveform 729 at approximately t=120, 300 and 360. As illustrated in the exemplary embodiment of FIG. 15, the controller 762, is configured to minimize the difference between the maximum temperature 721 and the minimum temperature 723 over time for the respective maximum temperature storage device 717 and the minimum storage device 719. This minimization is depicted when comparing the maximum temperature 721 and minimum temperature 723 curves after the controller 762 disconnected the maximum temperature storage device 717 and increased the temperature of the minimum temperature storage device 719, with the minimum temperature 733 curve and maximum temperature 731 curve which would result if the controller 762 did not disconnect or heat the respective maximum temperature storage device 717 and minimum temperature storage device 719. As shown in FIG. 15, the operating range of the energy storage system 712, measured by the temperature difference between the maximum energy 721 and the minimum energy 723 is noticeably reduced after the controller 762 disconnected the maximum temperature storage device 717 and increased the temperature of the minimum temperature storage device 719. Although FIG. 15 depicts the controller 762 having disconnected and increased the energy of a single maximum energy device 717 and minimum energy device 719, the controller may disconnect multiple energy devices and increase the temperature of multiple energy devices, so to narrow the operating temperature range of the energy storage system. Accordingly, the exemplary diagram of FIG. 15 includes exemplary values and ranges, and the embodiments of the present invention are not limited to any exemplary values or ranges shown in FIG. 15, or any other exemplary diagram of the present application.

Figure 16:
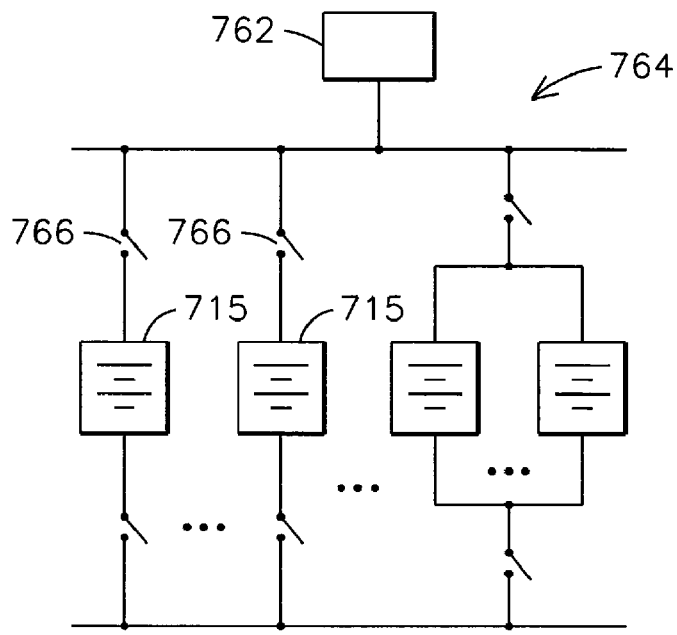
FIG. 16 is a block diagram of an exemplary embodiment of an energy storage system.

As illustrated in the exemplary embodiment of FIG. 16, the controller 762 is configured to disconnect one or more energy storage devices 715. The controller may be coupled to a parallel bus circuit 764, where each parallel bus circuit includes one or more switches 766 configured to selectively connect each energy storage device 715 in a parallel arrangement within each parallel bus circuit 764. The controller 762 is configured to selectively switch on and off each switch 766 to respectively connect and disconnect each energy storage device 715 from the energy storage system 712, as disclosed previously.

Figure 17:
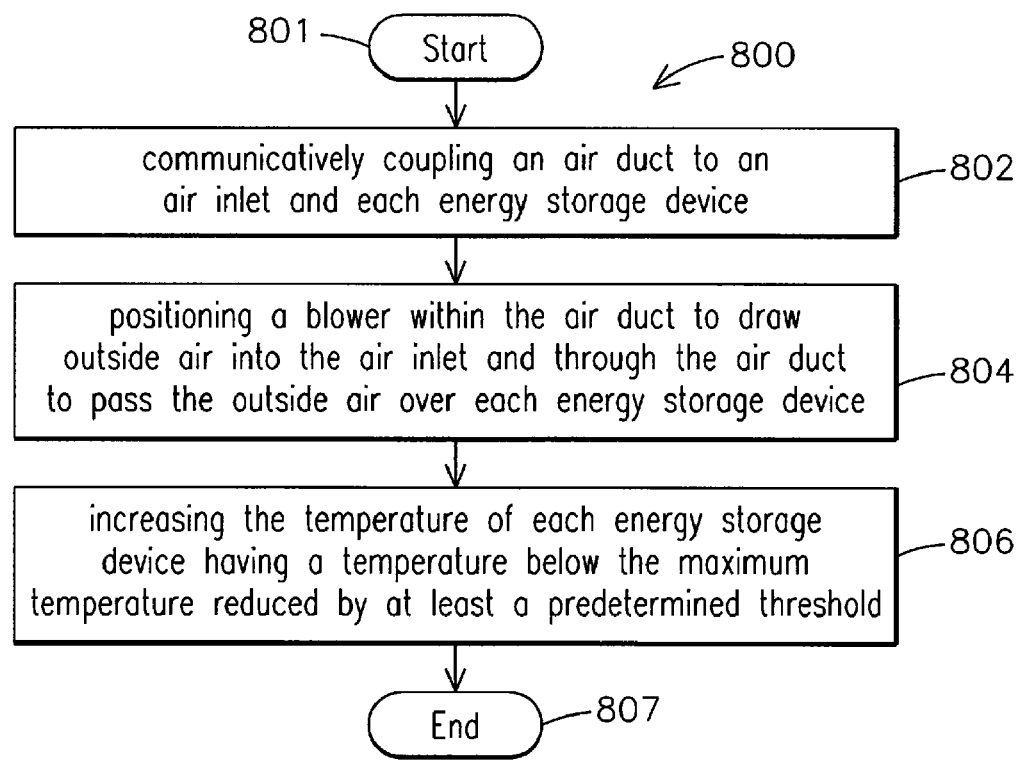
FIG. 17 is an exemplary embodiment of a method for cooling an energy storage system of a hybrid electric vehicle.

FIG. 17 illustrates an exemplary embodiment of a method 800 for cooling an energy storage system 712 of a hybrid diesel electric locomotive 714. The energy storage system 712 includes a plurality of energy storage devices 715, including a maximum temperature storage device 717 having a maximum temperature 721 and a minimum temperature storage device 719 having a minimum temperature 723. The method 800 begins (block 801) by communicatively coupling (block 802) an air duct 724 to an air inlet 718 and each energy storage device 715. The method 800 further includes positioning (block 804) a blower 726 within the air duct 724 to draw outside air into the air inlet 718 and through the air duct 724 to pass the outside air over or through each energy storage device 715. The method further includes increasing (block 806) the temperature of each energy storage device 715 having a temperature below the maximum temperature 721 reduced by at least a predetermined threshold, before ending at block 807.

Figure 18:
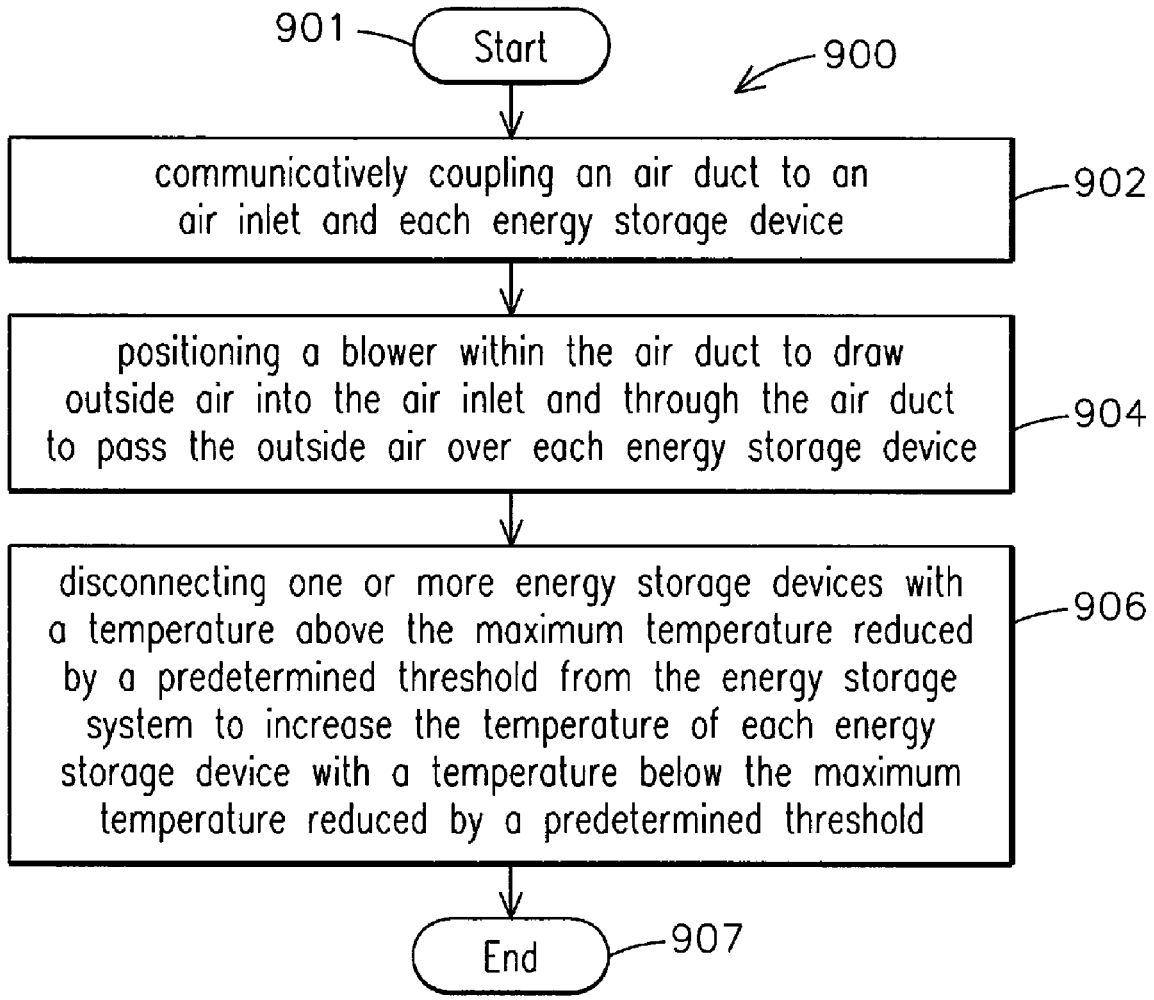
FIG. 18 is an exemplary embodiment of a method for cooling an energy storage system of a hybrid electric vehicle.

FIG. 18 illustrates an exemplary embodiment of a method 900 for cooling an energy storage system 712 of a hybrid diesel electric locomotive 714. The energy storage system 712 includes a plurality of energy storage devices 715, including a maximum temperature storage device 717 having a maximum temperature 721 and a minimum temperature storage device 719 having a minimum temperature 723. The method 900 begins (block 901) by communicatively coupling (block 902) an air duct 724 to an air inlet 718 and each energy storage device 715. The method 900 subsequently involves positioning (block 904) at least one blower 926 within the air duct 924 to draw outside air into the air inlet 718 and through the air duct 924 to pass the outside air over or through each energy storage device 715. The method further includes disconnecting (block 906) one or more energy storage devices 715 with a temperature above the maximum temperature 721 reduced by a predetermined threshold from the energy storage system 712 to increase the temperature of each energy storage device 715 with a temperature below the maximum temperature 721 reduced by a predetermined threshold, before ending at block 907.

Based on the foregoing specification, the above-discussed embodiments of the invention may be implemented using computer programming or engineering techniques including computer software, firmware, hardware or any combination or subset thereof, wherein the technical effect is to cool each energy storage device of a hybrid diesel electric vehicle. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody those discussed embodiments the invention.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

That which is claimed is:

1. A system for cooling an energy storage system of a hybrid electric vehicle, said energy storage system comprising at least one energy storage device, said system comprising:

at least one inlet positioned on an outer surface of the vehicle above a platform;

a cooling fluid duct in flow communication with the inlet and at least one of said at least one energy storage device;

a blower powered by a respective motor and positioned within said cooling fluid duct to draw outside air into said inlet and through said cooling fluid duct to pass said outside air over or through said at least one energy storage device and into a common vented area of said vehicle, wherein said common vented area comprises an engine compartment, wherein said at least one energy storage device includes a vent coupling to said engine compartment, and wherein said engine compartment includes at least one pre-existing vent external to said hybrid electric vehicle for passing said outside air; wherein said blower is positioned within said cooling fluid duct to draw outside air into said inlet and through said cooling fluid duct; having at least one power source for controllably operating said blower and motor to draw said outside air into said inlet and through said cooling fluid duct, and to pass said outside air over or through said at least one energy storage device and into said common vented area of said vehicle; having at least one damper control device positioned within said cooling fluid duct for selectively shutting off the supply of outside air to said blower; and at least one secondary duct configured to couple the cooling fluid duct to said at least one vent coupling to blend cooler air from the cooling fluid duct with hotter air in said at least one vent coupling to reduce the temperature of the air entering said engine compartment area;

at least one power source for controllably operating said blower and motor to draw said outside air into said inlet and through said cooling fluid duct, and to pass said outside air over or through said at least one energy storage device and into said common vented area of said vehicle; and at least one damper control device positioned within said cooling fluid duct for selectively shutting off the supply of outside air to said blower.

2. The system for cooling an energy storage system according to claim 1, wherein said hybrid electric vehicle comprises a hybrid off-highway vehicle, a hybrid marine vehicle, or a hybrid locomotive.

3. The system for cooling an energy storage system according to claim 1, further comprising: at least one filtering media positioned at a filtering location adjacent to said inlet within said cooling fluid duct, said at least one filtering media configured to remove at least one contaminant from said outside air prior to entering said cooling fluid duct.

4. The system for cooling an energy storage system according to claim 1, wherein said inlet is positioned on the outer surface of a roof portion of said hybrid electric vehicle to draw outside air through said inlet having a lesser amount of contaminants relative to outside air adjacent to the outer surface of said hybrid electric vehicle below said platform.

5. The system for cooling an energy storage system according to claim 1, wherein said inlet is positioned on the outer surface of a side portion of said hybrid electric vehicle to draw outside air through said inlet having a lesser amount of contaminants relative to outside air adjacent to the outer surface of said hybrid electric vehicle below said platform.

6. The system for cooling an energy storage system according to claim 1, wherein said blower is a continuous speed blower, a multiple speed blower of the speed of said power source, a continuously variable speed blower, a direct driven blower, or a switchable blower comprising a switch to turn the blower on and off.

7. The system for cooling an energy storage system according to claim 1, further comprising a controller for monitoring at least one thermometer coupled to said at least one energy storage device, wherein said controller selectively operates said one of a continuous speed blower, multiple speed blower of the speed of said power source, or a switchable blower, based upon comparing a monitored temperature from the thermometer of said at least one energy storage device with a respective predetermined temperature threshold of said at least one energy storage device.

* * * * *